US012756985B2

(12) United States Patent
Sun et al.

(10) Patent No.: US 12,756,985 B2
(45) Date of Patent: Oct. 6, 2026

(54) AUDIO PLAYING METHOD AND RELATED APPARATUS

(71) Applicant: HUAWEI TECHNOLOGIES CO., LTD., Shenzhen (CN)

(72) Inventors: Kunmao Sun, Dongguan (CN); Xiangyu Li, Shenzhen (CN); Tianyu Zheng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 137 days.

(21) Appl. No.: 18/929,576

(22) Filed: Oct. 28, 2024

(65) Prior Publication Data

US 2025/0056179 A1 Feb. 13, 2025

Related U.S. Application Data

(63) Continuation of application No. PCT/CN2023/090222, filed on Apr. 24, 2023.

(30) Foreign Application Priority Data

Apr. 27, 2022 (CN) ........................ 202210453369.2

(51) Int. Cl.
*H04S 7/00* (2006.01)
*H04R 5/02* (2006.01)

(52) U.S. Cl.
CPC ............... *H04S 7/302* (2013.01); *H04R 5/02* (2013.01); *H04S 2400/11* (2013.01); *H04S 2400/13* (2013.01)

(58) Field of Classification Search
CPC ... H04R 5/02; H04S 2400/11; H04S 2400/13; H04S 7/00; H04S 7/30; H04S 7/302; G11B 27/034
USPC ...................... 381/303, 56–58; 386/125, 515
See application file for complete search history.

(56) References Cited

U.S. PATENT DOCUMENTS

| | | | | |
|---|---|---|---|---|
| 2004/0131340 A1* | 7/2004 | Antoun | H04N 21/84 | |
| 2010/0111336 A1* | 5/2010 | Jeong | H04R 5/04 | 381/306 |
| 2016/0065791 A1* | 3/2016 | Li | H04S 7/30 | 348/515 |

(Continued)

FOREIGN PATENT DOCUMENTS

| | | |
|---|---|---|
| CN | 101330585 A | 12/2008 |
| CN | 109194999 A | 1/2019 |

(Continued)

*Primary Examiner* — Lun-See Lao

(57) ABSTRACT

This application provides an audio playing method and a related apparatus. The method includes an electronic device starts to play a first video clip, where a picture of the first video clip includes a first sound-making target; the electronic device obtains first audio output by the first sound-making target; at a first moment, when the electronic device determines that a location of the first sound-making target in the picture of the first video clip is a first location, the electronic device outputs the first audio via a first speaker; the electronic device obtains second audio output by the first sound-making target; and at a second moment, when the electronic device determines that the location of the first sound-making target in the picture of the first video clip is a second location, the electronic device outputs the second audio via a second speaker.

20 Claims, 16 Drawing Sheets

(56) References Cited

U.S. PATENT DOCUMENTS

| | | | | |
|---|---|---|---|---|
| 2016/0104491 | A1 * | 4/2016 | Lee | G10L 19/008 381/22 |
| 2019/0087870 | A1 * | 3/2019 | Gardyne | G11B 27/10 |

FOREIGN PATENT DOCUMENTS

| | | | |
|---|---|---|---|
| CN | 111641865 | A | 9/2020 |
| CN | 111666802 | A | 9/2020 |
| CN | 109862293 | B | 1/2021 |
| CN | 112911354 | A | 6/2021 |
| CN | 112929739 | A | 6/2021 |
| CN | 114071134 | A | 2/2022 |
| CN | 114286275 | A | 4/2022 |
| EP | 3958585 | A1 | 2/2022 |
| JP | 2010206265 | A | 9/2010 |
| KR | 20180018464 | A | 2/2018 |

* cited by examiner

AUDIO PLAYING METHOD AND RELATED APPARATUS

CROSS-REFERENCE TO RELATED APPLICATIONS

This application is a continuation of International Application No. PCT/CN2023/090222, filed on Apr. 24, 2023, which claims priority to Chinese Patent Application No. 202210453369.2, filed on Apr. 27, 2022. The disclosures of the aforementioned applications are hereby incorporated by reference in their entireties.

TECHNICAL FIELD

This application relates to the field of terminal technologies, and in particular, to an audio playing method and a related apparatus.

BACKGROUND

With the development of terminal technologies, sizes and functions of terminal devices are increasingly diversified to meet requirements of different users. For example, if a display area of a large display is large, a user can play a video on the large display, and this brings better video watching experience to the user.

However, as a display size of the terminal device increases, a motion area of an object in a picture displayed on the display is wider. As a result, when watching a movie or a TV series, the user often feels that a sound and a picture are separated and are not well integrated. In particular, in some scenarios such as dialog with people, flight of a flight vehicle, and car shuttle, separation between a sound and an image is more obvious. Therefore, how to integrate a sound in a video and a sound-making object in the video is an urgent problem to be resolved.

SUMMARY

This application provides an audio playing method and a related apparatus, so that a sound-making location of a target sound-making object in a video picture changes with a location of the target sound-making object in the video picture. This implements "audio video integration" effect, and improves video watching experience of a user.

According to a first aspect, this application provides an audio playing method, applied to an electronic device including a plurality of speakers, where the plurality of speakers include a first speaker and a second speaker, and the method includes: the electronic device starts to play a first video clip, where a picture of the first video clip includes a first sound-making target; the electronic device obtains, from audio data of the first video clip, first audio output by the first sound-making target; at a first moment, when the electronic device determines that a location of the first sound-making target in the picture of the first video clip is a first location, the electronic device outputs the first audio via the first speaker; the electronic device obtains, from the audio data of the first video clip, second audio output by the first sound-making target; and at a second moment, when the electronic device determines that the location of the first sound-making target in the picture of the first video clip is a second location, the electronic device outputs the second audio via the second speaker, where the first moment is different from the second moment, the first location is different from the second location, and the first speaker is different from the second speaker.

The electronic device obtains the first audio output by the first sound-making target, and the electronic device obtains the second audio output by the first sound-making target. The first audio and the second audio may be extracted and obtained by the electronic device in real time, or the electronic device may obtain in advance complete audio output by the first sound-making target, where the first audio and the second audio are audio clips in the complete audio output by the first sound-making target at different moments.

According to the method provided in the first aspect, the electronic device can change a sound-making location of a target sound-making object based on a relative distance between the target sound-making object in an image frame and each loudspeaker on the electronic device, so that the sound-making location of the target sound-making object in a video changes with a display location of the target sound-making object on a display. This implements "audio video integration" and improves video watching experience of a user.

With reference to the first aspect, in an implementation, that when the electronic device determines that a location of the first sound-making target in the picture of the first video clip is a first location, the electronic device outputting the first audio via the first speaker includes: when the electronic device determines that a distance between the first location of the first sound-making target in the picture of the first video clip and the first speaker is shorter than a distance between the first location of the first sound-making target in the picture of the first video clip and the second speaker, the electronic device outputs the first audio via the first speaker; and that when the electronic device determines that the location of the first sound-making target in the picture of the first video clip is a second location, the electronic device outputting the second audio via the second speaker includes: when the electronic device determines that the distance between the first location of the first sound-making target in the picture of the first video clip and the second speaker is shorter than the distance between the first location of the first sound-making target in the picture of the first video clip and the first speaker, the electronic device outputs the second audio via the second speaker. In this way, after determining that the location of the first sound-making target in the picture of the first video clip is the first location, the electronic device further determines a speaker closest to the first location, and outputs, via the closest speaker, audio that is output by the first sound-making target at a corresponding moment, so that the sound-making location of the target sound-making object changes with the display location of the target sound-making object on the display.

With reference to the first aspect, in an implementation, that when the electronic device determines that a location of the first sound-making target in the picture of the first video clip is a first location, the electronic device outputting the first audio via the first speaker includes: when the electronic device determines that a distance between the first location of the first sound-making target in the picture of the first video clip and the first speaker is shorter than a distance between the first location of the first sound-making target in the picture of the first video clip and the second speaker, the electronic device outputs the first audio via the first speaker at a first volume value and outputs the first audio via the second speaker at a second volume value, where the first volume value is greater than the second volume value; and that when the electronic device determines that the location of the first sound-making target in the picture of the first video clip is a second location, the electronic device outputting the second audio via the second speaker includes: when the electronic device determines that the distance between the first location of the first sound-making target in the picture of the first video clip and the second speaker is shorter than the distance between the first location of the first sound-making target in the picture of the first video clip and the first speaker, the electronic device outputs the first audio via the second speaker at a third volume value and outputs the first audio via the first speaker at a fourth volume value, where the third volume value is greater than the fourth volume value. In this way, after determining that the location of the first sound-making target in the picture of the first video clip is the first location, the electronic device further determines a distance between each speaker and the first location. With different distances, output volume of each speaker is different, that is, each speaker may simultaneously make a sound. The shorter a distance, the higher output volume of a speaker. The longer a distance, the lower output volume of a speaker.

With reference to the first aspect, in an implementation, the picture of the first video clip includes a second sound-making target, and the method further includes: the electronic device extracts, from the audio data of the first video clip, third audio output by the second sound-making target; at a third moment, when the electronic device determines that a location of the second sound-making target in the picture of the first video clip is a third location, the electronic device outputs the third audio via the first speaker; the electronic device extracts, from the audio data of the first video clip, fourth audio output by the second sound-making target; and at a fourth moment, when the electronic device determines that the location of the second sound-making target in the picture of the first video clip is a fourth location, the electronic device outputs the fourth audio via the second speaker, where the third moment is different from the fourth moment, and the third location is different from the fourth location. In this way, the electronic device can simultaneously detect locations of a plurality of sound-making targets and speakers, and change sound-making locations of the plurality of sound-making targets.

With reference to the first aspect, in an implementation, the plurality of speakers further include a third speaker; and after the electronic device outputs the first audio via the first speaker, the method further includes: in a case in which the electronic device does not detect the location of the first sound-making target in the picture of the first video clip after first time has passed or a quantity of image frames has exceeded a first quantity, the electronic device outputs audio of the first sound-making target via the third speaker. In this way, when the electronic device detects only the audio of the first sound-making target, but does not detect an image location of the first sound-making target in the image data, the electronic device outputs the audio of the first sound-making target via a preset speaker.

With reference to the first aspect, in an implementation, that when the electronic device determines that a distance between the first location of the first sound-making target in the picture of the first video clip and the first speaker is shorter than a distance between the first location of the first sound-making target in the picture of the first video clip and the second speaker, the electronic device outputting the first audio via the first speaker include: the electronic device obtains location information of the first speaker and location information of the second speaker; and the electronic device determines, based on the first location of the first sound-making target in the picture of the first video clip, the location information of the first speaker, and the location information of the second speaker, that the distance between the first location of the first sound-making target in the picture of the first video clip and the first speaker is shorter than the distance between the first location of the first sound-making target in the picture of the first video clip and the second speaker. In this way, a location of each speaker on the electronic device is specific, and the electronic device can determine a distance between the first sound-making target and each speaker based on the location of each speaker and a location of the first sound-making target in the picture.

With reference to the first aspect, in an implementation, that the electronic device obtains, from audio data of the first video clip, first audio output by the first sound-making target includes: the electronic device obtains a plurality of types of audio from the audio data of the first video clip based on a plurality of types of preset audio features; and the electronic device determines, from the plurality of types of audio, the first audio output by the first sound-making target. In this way, the electronic device can calculate, based on the plurality of types of preset audio features, similarity between the plurality of types of audio in the audio data and the plurality of types of preset audio features, to determine the first audio output by the first sound-making target.

With reference to the first aspect, in an implementation, that the electronic device determines that a location of the first sound-making target in the picture of the first video clip is a first location includes: the electronic device identifies, from the picture of the first video clip based on the plurality of types of preset image features, a first target image corresponding to the first sound-making target; and the electronic device determines, based on a display area of the first target image in the picture of the first video clip, that the location of the first sound-making target in the picture of the first video clip is the first location. In this way, the electronic device can determine, based on the plurality of types of preset image features, an image feature of the first target image corresponding to the first sound-making target, to determine a location of the first target image in the picture of the first video clip.

With reference to the first aspect, in an implementation, the plurality of speakers further include a fourth speaker; and before the electronic device outputs the first audio, the method further includes: the electronic device obtains preset sound channel information from the audio data of the first video clip, where the preset sound channel information includes outputting the first audio and a first background sound from the fourth speaker; and that when the electronic device determines that a location of the first sound-making target in the picture of the first video clip is a first location, the electronic device outputting the first audio via the first speaker includes: when the electronic device determines that the location of the first sound-making target in the picture of the first video clip is the first location, the electronic device outputs the first audio via the first speaker, and outputs the first background sound via the fourth speaker. In this way, when determining that the location of the first sound-making target in the picture of the first video clip is the first location, the electronic device can render the first audio to the first speaker, output the first audio via the first speaker, and output other audio such as a background sound and a music sound via a preset speaker.

With reference to the first aspect, in an implementation, location information of the plurality of speakers on the electronic device is different. In this way, the sound-making location of the target sound-making object changes with the display location of the target sound-making object on the display.

With reference to the first aspect, in an implementation, a type of the first sound-making target is any one of the following: a person, an animal, an object, and a landscape.

With reference to the first aspect, in an implementation, a type of the first audio is any one of the following: a human sound, an animal sound, an ambient sound, a music sound, and an object sound.

According to a second aspect, an embodiment of this application provides an audio playing method, where the method includes: an electronic device starts to play a first video clip, where a picture of the first video clip includes a first sound-making target; the electronic device extracts, from audio data of the first video clip, first audio output by the first sound-making target; at a first moment, when the electronic device determines that a location of the first sound-making target in the picture of the first video clip is a first location, the electronic device outputs the first audio via a first audio output device; the electronic device extracts, from the audio data of the first video clip, second audio output by the first sound-making target; and at a second moment, when the electronic device determines that the location of the first sound-making target in the picture of the first video clip is a second location, the electronic device outputs the second audio via a second audio output device, where the first moment is different from the second moment, the first location is different from the second location, and the first audio output device is different from the second audio output device.

The electronic device obtains the first audio output by the first sound-making target, and the electronic device obtains the second audio output by the first sound-making target. The first audio and the second audio may be extracted and obtained by the electronic device in real time, or the electronic device may obtain in advance complete audio output by the first sound-making target, where the first audio and the second audio are audio clips in the complete audio output by the first sound-making target at different moments.

According to the method provided in the second aspect, when the electronic device is externally connected to an audio output device, the electronic device can change a sound-making location of the target sound-making object based on a relative distance between the target sound-making object in an image frame and the audio output device, so that the sound-making location of the target sound-making object in a video changes with a display location of the target sound-making object on a display. This implements “audio video integration” and improves video watching experience of a user.

With reference to the second aspect, in an implementation, a type of the first audio output device is any one of the following: a sound box, an earphone, a power amplifier, a multimedia console, and an audio adapter.

With reference to the second aspect, in an implementation, that when the electronic device determines that a location of the first sound-making target in the picture of the first video clip is a first location, the electronic device outputting the first audio via a first audio output device includes: when the electronic device determines that a distance between the first location of the first sound-making target in the picture of the first video clip and the first audio output device is shorter than a distance between the first location of the first sound-making target in the picture of the first video clip and the second audio output device, the electronic device outputs the first audio via the first audio output device; and that when the electronic device determines that the location of the first sound-making target in the picture of the first video clip is a second location, the electronic device outputting the second audio via a second audio output device includes: when the electronic device determines that the distance between the first location of the first sound-making target in the picture of the first video clip and the second audio output device is shorter than the distance between the first location of the first sound-making target in the picture of the first video clip and the first audio output device, the electronic device outputs the second audio via the second audio output device. In this way, after determining that the location of the first sound-making target in the picture of the first video clip is the first location, the electronic device further determines an audio output device closest to the first location, and outputs, via the closest audio output device, audio that is output by the first sound-making target at a corresponding moment, so that the sound-making location of the target sound-making object changes with the display location of the target sound-making object on the display.

With reference to the second aspect, in an implementation, that when the electronic device determines that a location of the first sound-making target in the picture of the first video clip is a first location, the electronic device outputting the first audio via a first audio output device includes: when the electronic device determines that a distance between the first location of the first sound-making target in the picture of the first video clip and the first audio output device is shorter than a distance between the first location of the first sound-making target in the picture of the first video clip and the second audio output device, the electronic device outputs the first audio via the first audio output device at a first volume value and outputs the first audio via the second audio output device at a second volume value, where the first volume value is greater than the second volume value; and that when the electronic device determines that the location of the first sound-making target in the picture of the first video clip is a second location, the electronic device outputting the second audio via a second audio output device includes: when the electronic device determines that the distance between the first location of the first sound-making target in the picture of the first video clip and the second audio output device is shorter than the distance between the first location of the first sound-making target in the picture of the first video clip and the first audio output device, the electronic device outputs the first audio via the second audio output device at a third volume value and outputs the first audio via the first audio output device at a fourth volume value, where the third volume value is greater than the fourth volume value. In this way, after determining that the location of the first sound-making target in the picture of the first video clip is the first location, the electronic device further determines a distance between each audio output device and the first location. With different distances, output volume of each audio output device is different, that is, each audio output device may simultaneously make a sound. The shorter a distance, the higher output volume of an audio output device. The longer a distance, the lower output volume of an audio output device.

With reference to the second aspect, in an implementation, the picture of the first video clip includes a second sound-making target, and the method further includes: the electronic device extracts, from the audio data of the first video clip, third audio output by the second sound-making target; at a third moment, when the electronic device determines that a location of the second sound-making target in the picture of the first video clip is a third location, the electronic device outputs the third audio via the first audio output device; the electronic device extracts, from the audio data of the first video clip, fourth audio output by the second sound-making target; and at a fourth moment, when the electronic device determines that the location of the second sound-making target in the picture of the first video clip is a fourth location, the electronic device outputs the fourth audio via the second audio output device, where the third moment is different from the fourth moment, and the third location is different from the fourth location. In this way, the electronic device can simultaneously detect locations of a plurality of sound-making targets and audio output devices, and change sound-making locations of the plurality of sound-making targets.

With reference to the second aspect, in an implementation, a plurality of audio output devices further include a third audio output device; and after the electronic device outputs the first audio via the first audio output device, the method further includes: in a case in which the electronic device does not detect the location of the first sound-making target in the picture of the first video clip after first time has passed or a quantity of image frames has exceeded a first quantity, the electronic device outputs audio of the first sound-making target via the third audio output device. In this way, when the electronic device detects only the audio of the first sound-making target, but does not detect an image location of the first sound-making target in the image data, the electronic device outputs the audio of the first sound-making target via a preset audio output device.

With reference to the second aspect, in an implementation, that when the electronic device determines that a distance between the first location of the first sound-making target in the picture of the first video clip and the first audio output device is shorter than a distance between the first location of the first sound-making target in the picture of the first video clip and the second audio output device, the electronic device outputting the first audio via the first audio output device include: the electronic device obtains location information of the first audio output device and location information of the second audio output device; and the electronic device determines, based on the first location of the first sound-making target in the picture of the first video clip, the location information of the first audio output device, and the location information of the second audio output device, that the distance between the first location of the first sound-making target in the picture of the first video clip and the first audio output device is shorter than the distance between the first location of the first sound-making target in the picture of the first video clip and the second audio output device. In this way, a location of each audio output device on the electronic device is specific, and the electronic device can determine a distance between the first sound-making target and each audio output device based on the location of each audio output device and a location of the first sound-making target in the picture.

With reference to the second aspect, in an implementation, that the electronic device obtains, from audio data of the first video clip, first audio output by the first sound-making target includes: the electronic device obtains a plurality of types of audio from the audio data of the first video clip based on a plurality of types of preset audio features; and the electronic device determines, from the plurality of types of audio, the first audio output by the first sound-making target. In this way, the electronic device can calculate, based on the plurality of types of preset audio features, similarity between the plurality of types of audio in the audio data and the plurality of types of preset audio features, to determine the first audio output by the first sound-making target.

With reference to the second aspect, in an implementation, that the electronic device determines that a location of the first sound-making target in the picture of the first video clip is a first location includes: the electronic device identifies, from the picture of the first video clip based on the plurality of types of preset image features, a first target image corresponding to the first sound-making target; and the electronic device determines, based on a display area of the first target image in the picture of the first video clip, that the location of the first sound-making target in the picture of the first video clip is the first location. In this way, the electronic device can determine, based on the plurality of types of preset image features, an image feature of the first target image corresponding to the first sound-making target, to determine a location of the first target image in the picture of the first video clip.

With reference to the second aspect, in an implementation, the plurality of audio output devices further include a fourth audio output device; and before the electronic device outputs the first audio, the method further includes: the electronic device obtains preset sound channel information from the audio data of the first video clip, where the preset sound channel information includes outputting the first audio and a first background sound from the fourth audio output device; and that when the electronic device determines that a location of the first sound-making target in the picture of the first video clip is a first location, the electronic device outputs the first audio via a first audio output device includes: when the electronic device determines that the location of the first sound-making target in the picture of the first video clip is the first location, the electronic device outputs the first audio via the first audio output device, and outputs the first background sound via the fourth audio output device. In this way, when determining that the location of the first sound-making target in the picture of the first video clip is the first location, the electronic device can render the first audio to the first audio output device, output the first audio via the first audio output device, and output other audio such as a background sound and a music sound via a preset audio output device.

With reference to the second aspect, in an implementation, location information of the plurality of audio output devices on the electronic device is different. In this way, the sound-making location of the target sound-making object changes with the display location of the target sound-making object on the display.

According to a third aspect, this application provides an electronic device, where the electronic device includes one or more processors and one or more memories. The one or more memories are coupled to the one or more processors, the one or more memories are configured to store computer program code, and the computer program code includes computer instructions; and the one or more processors invoke the computer instructions, so that the electronic device performs the audio playing method provided in any implementation of any one of the foregoing aspects.

According to a fourth aspect, this application provides a computer-readable storage medium, where the computer-readable storage medium stores instructions. When the instructions are run on an electronic device, the electronic device is enabled to perform the audio playing method provided in any implementation of any one of the foregoing aspects.

According to a fifth aspect, this application provides a computer program product. When the computer program product is executed by an electronic device, the electronic device is enabled to perform the audio playing method provided in any implementation of any one of the foregoing aspects.

According to a sixth aspect, this application provides a chip or a chip system, including a processing circuit and an interface circuit. The interface circuit is configured to receive code instructions and transmit the code instructions to the processing circuit, and the processing circuit is configured to run the code instructions to perform the audio play method provided in any implementation of any one of the foregoing aspects.

DESCRIPTION OF EMBODIMENTS

Figure 1:
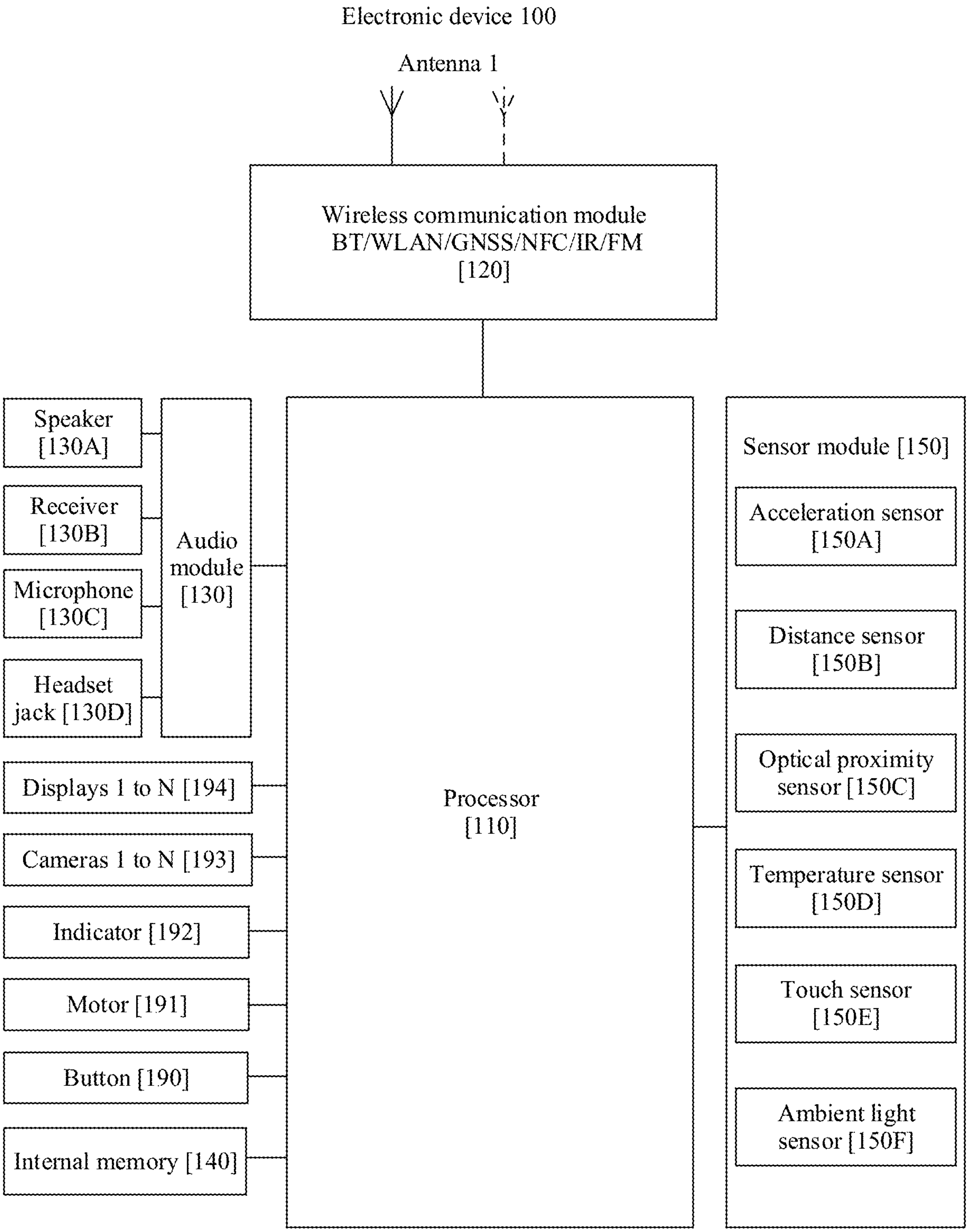
FIG. 1 is a diagram of a structure of an electronic device according to an embodiment of this application.

Technical solutions according to embodiments of this application are clearly and completely described in the following with reference to the accompanying drawings. In the descriptions of embodiments of this application, unless otherwise stated, "/" represents "or". For example, A/B may represent A or B. In this specification, "and/or" merely describes an association relationship between associated objects and represents that three relationships may exist. For example, A and/or B may represent the following three cases: only A exists, both A and B exist, and only B exists. In addition, in the descriptions of embodiments of this application, "a plurality of" means two or more than two.

The terms "first" and "second" mentioned below are merely intended for the purpose of description, and shall not be understood as an indication or implication of relative importance or implicit indication of a quantity of indicated technical features. Therefore, a feature limited by "first" and "second" may explicitly or implicitly include one or more features. In the descriptions of embodiments of this application, unless otherwise specified, "a plurality of" means two or more.

A term "user interface (UI)" in the following embodiments of this application is a medium interface for interaction and information exchange between an application or an operating system and a user, and implements conversion between an internal form of information and a form acceptable to the user. The user interface is source code written in a computer language like Java or an extensible markup language (XML). Interface source code is parsed and rendered on an electronic device, and is finally presented as user-recognizable content. A user interface is in a common representation form of a graphical user interface (GUI), is related to a computer operation and displayed in a graphical manner, and may be a visual interface element like a text, an icon, a button, a menu, a tab, a text box, a dialog box, a status bar, a navigation bar, or a widget displayed on a display of an electronic device.

Integration of a sound in a video and a sound-making object in the video may be implemented in the following manner.

Manner 1: Integration of the sound in the video and the sound-making object in the video is implemented based on an organic light emitting diode (OLED) sound on display technology.

The OLED sound on display technology is to fix a plurality of vibration loudspeakers behind an OLED display, and drive the display to emit a sound via the vibration loudspeakers, so that an audience can think that the sound comes out of the display to some extent. However, the OLED display is large, and an object in a picture may move freely in a display area of the OLED display. However, a sound corresponding to the picture can be made only via the loudspeaker behind the OLED display, that is, a sound-making location is specific. As a result, a generation location of the sound corresponding to the picture cannot change with movement of the object in the picture, that is, a sound of a moving object cannot be tracked.

Based on this, embodiments of this application provide an audio playing method. The method includes the following steps.

Step 1: An electronic device obtains video data, where the video data includes audio data and image data.

The video data may be real-time data obtained by the electronic device, or may be cached data obtained by the electronic device.

The audio data includes an audio file and preset sound channel information of the audio file, and the preset sound channel information limits a sound channel through which the electronic device outputs the audio file. The preset sound channel information may be, for example, a left sound channel, a right sound channel, or a center sound channel. The left sound channel may be classified into a left front channel, a left rear channel, and the like. The right sound channel may be classified into a right front channel, a right rear channel, and the like.

When the preset channel information in the audio data is a left front channel, a right front channel, and a center sound channel, the electronic device plays the audio file via a left front loudspeaker, a right front loudspeaker, and a center loudspeaker on the electronic device.

Step 2: The electronic device extracts audio of a preset type from the audio file. The audio of the preset type includes a human sound, an animal sound, an ambient sound, a music sound, an object sound, and the like.

In other words, a plurality of different types of audio, for example, the human sound, the animal sound, the ambient sound, the music sound, the object sound are integrated in the audio file in the video data, to form the complete audio file. The electronic device may separate the plurality of types of audio integrated in the audio file, to obtain the plurality of different types of audio.

Step 3: The electronic device identifies a target sound-making object in the image data, and determines location coordinates of the target sound-making object on a display of the electronic device.

Then, the electronic device determines a distance between the target sound-making object and each loudspeaker based on the location coordinates of the target sound-making object on the display and locations of a plurality of loudspeakers on the electronic device, and finally determines a loudspeaker closest to the target sound-making object.

Step 4: The electronic device outputs, via the loudspeaker closest to the target sound-making object, audio corresponding to the target sound-making object.

The electronic device outputs, via a first loudspeaker closest to the target sound-making object, the audio corresponding to the target sound-making object, and outputs audio of a non-preset type via a loudspeaker corresponding to the original sound channel information.

Alternatively, the electronic device outputs, via a first audio output device corresponding to a first loudspeaker closest to the target sound-making object, the audio corresponding to the target sound-making object, and outputs audio of a non-preset type via an audio output device corresponding to a loudspeaker corresponding to the original sound channel information. The audio output device may be a sound amplification device like a sound box. In this way, the electronic device can output audio via an audio output device corresponding to a loudspeaker, to improve sound quality and volume of the output audio.

In some embodiments, if there are a plurality of loudspeakers closest to the target sound-making object, the electronic device may simultaneously output, via the plurality of loudspeakers, the audio corresponding to the target sound-making object.

In some embodiments, a location of the target sound-making object on the display changes in real time. After the location of the target sound-making object changes, a distance between the target sound-making object and each loudspeaker on the electronic device also changes. After the electronic device determines a second loudspeaker closest to the target sound-making object, the electronic device outputs, via the second loudspeaker closest to the target sound-making object, the audio corresponding to the target sound-making object. A location of the first loudspeaker is different from a location of the second loudspeaker.

Alternatively, the electronic device outputs, via a second audio output device corresponding to a second loudspeaker closest to the target sound-making object, the audio corresponding to the target sound-making object.

That the electronic device obtains the audio output by the target sound-making object may be that the electronic device extracts, in real time, audio output at each moment, or the electronic device may obtain, in advance, complete audio output by the target sound-making object.

Optionally, in addition to making the sound via the closest loudspeaker, the electronic device may further make sounds simultaneously via the plurality of loudspeakers, but output volume of each speaker is different with different distances. The shorter a distance, the higher output volume of a speaker. The longer a distance, the lower output volume of a speaker.

For example, if the electronic device determines that a distance between the target sound-making object and a first speaker is shorter than a distance between the target sound-making object and a second speaker, the electronic device may simultaneously output, via the first speaker and the second speaker, first audio output by the target sound-making object, but volume of the first audio output by the first speaker is greater than volume of the first audio output by the second speaker.

According to the audio playing method provided in embodiments of this application, the electronic device can determine, based on a relative distance between the target sound-making object in an image frame and each loudspeaker on the electronic device, a loudspeaker closest to the target sound-making object in the relative distance, and output, via the closest loudspeaker or the audio output device corresponding to the closest loudspeaker, the audio corresponding to the target sound-making object, so that a sound-making location of the target sound-making object in a video changes with a display location of the target sound-making object on the display. This implements "audio video integration" and improves video watching experience of a user.

FIG. 1 is a diagram of a structure of an electronic device 100.

The electronic device 100 is a device configured with loudspeakers in different position directions, and a device configured with loudspeakers in at least two different position directions. A position direction of a loudspeaker is relative to the electronic device 100. For example, a center of a display of the electronic device 100 is used as a center point, and the loudspeakers on the electronic device 100 may be classified into a front left loudspeaker, a right front loudspeaker, a left rear loudspeaker, a right rear loudspeaker, a center loudspeaker (namely, a loudspeaker located at the center point of the electronic device), and the like. In another embodiment, the electronic device 100 may further include other loudspeakers in more position directions. This is not limited in embodiments of this application.

A type of the electronic device 100 includes but is not limited to a large display, a projector, a mobile phone, a tablet computer, a desktop computer, a laptop computer, a handheld computer, a notebook computer, an ultra-mobile personal computer (UMPC), a netbook, an augmented reality (AR) device, a virtual reality (VR) device, an artificial intelligence (AI) device, a wearable device, a vehicle-mounted device, a smart home device, a smart city device, and/or the like. A type of the electronic device 100 is not limited in embodiments of this application. In the following embodiments of this application, an example in which the electronic device 100 is a large display is used for description.

The electronic device 100 may include a processor 110, a wireless communication module 120, an audio module 130, an internal memory 140, a button 190, a motor 191, an indicator 192, a camera 193, a display 194, a sensor module 150, and the like. The audio module 130 may include a speaker 130A, a receiver 130B, a microphone 130C, and a headset interface 130D. The sensor module 150 may include an acceleration sensor 150A, a distance sensor 150B, an optical proximity sensor 150C, a temperature sensor 150D, a touch sensor 150E, an ambient light sensor 150F, and the like.

In some embodiments, the electronic device 100 may not include the microphone 130C and the headset interface 130D.

In some embodiments, the electronic device 100 may not include any one or more of the sensor modules 150.

It may be understood that the structure shown in this embodiment of the present disclosure does not constitute a limitation on the electronic device 100. In some other embodiments of this application, the electronic device 100 may include more or fewer components than those shown in the figure, or some components may be combined, or some components may be split, or different component arrangements may be arranged. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors. The processor 110 may be configured to extract audio of a preset type from an audio file, and the audio of the preset type includes a human sound, an animal sound, an ambient sound, a music sound, an object sound, and the like. The processor 110 is further configured to: identify a target sound-making object in image data, determine location coordinates of the target sound-making object on the display of the electronic device, and output, based on the location coordinates of the target sound-making object on the display of the electronic device via a loudspeaker closest to the target sound-making object, audio corresponding to the target sound-making object. For details, refer to detailed descriptions in subsequent embodiments. Details are not described herein in this embodiment of this application.

The controller may generate an operation control signal based on instruction operation code and a time sequence signal, to complete control of instruction fetching and instruction execution.

A memory may be disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus, including a serial data line (SDA) and a serial clock line (SCL). In some embodiments, the processor 110 may include a plurality of groups of I2C buses.

The I2S interface may be configured to perform audio communication. In some embodiments, the processor 110 may include a plurality of groups of I2S buses. The processor 110 may be coupled to the audio module 130 through the I2S bus, to implement communication between the processor 110 and the audio module 130.

The PCM interface may also be used to perform audio communication, and sample, quantize, and code an analog signal. In some embodiments, the audio module 130 may be coupled to the wireless communication module 120 through a PCM bus interface.

The UART interface is a universal serial data bus, and is configured to perform asynchronous communication. The bus may be a two-way communication bus. The UART interface converts to-be-transmitted data between serial communication and parallel communication. In some embodiments, the UART interface is usually configured to connect the processor 110 to the wireless communication module 120.

The MIPI interface may be configured to connect the processor 110 to a peripheral component like the display 194 or the camera 193. The MIPI interface includes a camera serial interface (CSI), a display serial interface (DSI), and the like. In some embodiments, the processor 110 communicates with the camera 193 via the CSI, to implement a photographing function of the electronic device 100. The processor 110 communicates with the display 194 via the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 120, the audio module 130, the sensor module 150, or the like. The GPIO interface may alternatively be configured as an I2C interface, an I2S interface, a UART interface, an MIPI interface, or the like.

The USB interface is an interface that conforms to a USB standard specification, and may be a mini USB interface, a micro USB interface, a USB type-C interface, or the like. The USB interface may be configured to perform data transmission between the electronic device 100 and a peripheral device, or may be configured to connect to a headset for playing audio through the headset. The interface may be configured to connect to another electronic device like an AR device.

It may be understood that an interface connection relationship between the modules that is shown in this embodiment of the present disclosure is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

A wireless communication function of the electronic device 100 may be implemented through the antenna 1, the wireless communication module 120, the modem processor, the baseband processor, and the like.

The antenna 1 is configured to transmit and receive an electromagnetic wave signal. Each antenna in the electronic device 100 may be configured to cover one or more communication frequency bands. Different antennas may be multiplexed, to improve antenna utilization. For example, the antenna 1 may be multiplexed as a diversity antenna of a wireless local area network. In some other embodiments, the antenna may be used in combination with a tuning switch.

The wireless communication module 120 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 120 may be one or more components integrating at least one communication processor module. The wireless communication module 120 receives an electromagnetic wave through the antenna 1, performs demodulation and filtering processing on an electromagnetic wave signal, and sends a processed signal to the processor 110. The wireless communication module 120 may further receive a to-be-sent signal from the processor 110, perform frequency modulation and amplification on the signal, and convert the signal into an electromagnetic wave for radiation through the antenna 1.

In some embodiments, in the electronic device 100, the antenna 1 and the wireless communication module 120 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, and execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, and brightness of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the electronic device 100 may include one or N cameras 193, where N is a positive integer greater than 1. In some embodiments, the electronic device 100 may not include the camera 193.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (MPEG)-1, MPEG-2, MPEG-3, and MPEG-4.

The NPU is a neural-network (NN) computing processor, and simulates a biological neural network structure like a transmission mode between neurons in a human brain to perform rapid processing on input information, and can perform continuous self-learning. Applications such as intelligent cognition of the electronic device 100 may be implemented through the NPU, for example, image recognition, facial recognition, speech recognition, and text understanding.

The internal memory 140 may include one or more random access memories (RAMs), and one or more non-volatile memories (NVMs).

The random access memory may include a static random access memory (SRAM), a dynamic random access memory (DRAM), a synchronous dynamic random access memory (SDRAM), a double data rate synchronous dynamic random access memory (DDR SDRAM, like a 5th generation DDR SDRAM, generally referred to as a DDR5 SDRAM), or the like. The non-volatile memory may include a magnetic disk storage device and a flash memory.

The flash memory may be classified into an NOR flash, an NAND flash, a 3D NAND flash, and the like according to an operation principle; may be classified into a single-level cell (SLC), a multi-level cell (MLC), a triple-level cell (TLC), a quad-level cell (QLC), and the like based on a quantity of electric potential levels of a cell; or may be classified into a universal flash storage (UFS), an embedded multimedia card (eMMC), and the like according to storage specifications.

The random access memory may be directly read and written by using the processor 110, may be configured to store executable programs (for example, machine instructions) in an operating system or another running program, and may be configured to store data of a user, data of an application, and the like.

The non-volatile memory may also store the executable programs, the data of the users and the applications, and the like, and may be loaded into the random access memory in advance, to be directly read and written by the processor 110.

The electronic device 100 may implement an audio function, for example, music playing and recording, through the audio module 130, the speaker 130A, the receiver 130B, the microphone 130C, the headset jack 130D, the application processor, and the like.

The audio module 130 is configured to convert digital audio information into an analog audio signal output, and is also configured to convert an analog audio input into a digital audio signal. The audio module 130 may be configured to code and decode an audio signal. In some embodiments, the audio module 130 may be disposed in the processor 110, or some function modules in the audio module 130 are disposed in the processor 110.

The speaker 130A, also referred to as a "loudspeaker", is configured to convert an audio electrical signal into a sound signal. The electronic device 100 may listen to music via the speaker 130A. Optionally, the electronic device 100 may have a plurality of loudspeakers, and locations of the plurality of loudspeakers on the electronic device 100 are different. For example, a center point of a display of the electronic device 100 is used as a center point, and the loudspeakers on the electronic device 100 may be classified into a front left loudspeaker, a right front loudspeaker, a left rear loudspeaker, a right rear loudspeaker, a center loudspeaker (namely, a loudspeaker located at a center point of the electronic device), and the like. In another embodiment, the electronic device 100 may further include other loudspeakers in more position directions. This is not limited in embodiments of this application.

In some embodiments, the electronic device 100 may be externally connected to one or more audio output devices (for example, a sound box) in a wired or wireless manner, so that the electronic device 100 can output audio via the externally connected one or more audio output devices, thereby improving sound quality of the output audio.

The receiver 130B, also referred to as an "earpiece", is configured to convert an electrical audio signal into a sound signal. When a call is answered or speech information is received through the electronic device 100, the receiver 130B may be put close to a human ear to listen to a speech. In some embodiments, the electronic device 100 may not include the receiver 130B.

The microphone 130C, also referred to as a "mike" or a "mic", is configured to convert a sound signal into an electrical signal. When making a call or sending a speech information, a user may make a sound near the microphone 130C through the mouth of the user, to input a sound signal to the microphone 130C. At least one microphone 130C may be disposed in the electronic device 100. In some other embodiments, two microphones 130C may be disposed in the electronic device 100, to collect a sound signal and implement a noise reduction function. In some other embodiments, three, four, or more microphones 130C may alternatively be disposed in the electronic device 100, to collect a sound signal, implement noise reduction, and identify a sound source, thereby implementing a directional recording function, and the like. In some embodiments, the electronic device 100 may not include the microphone 130C.

The headset jack 130D is configured to connect to a wired headset. The headset jack 130D may be a USB interface, or may be a 3.5 mm open mobile terminal platform (OMTP) standard interface, or a cellular telecommunications industry association of the USA (CTIA) standard interface. In some embodiments, the electronic device 100 may not include the headset jack 130D.

The acceleration sensor 150A may detect accelerations in various directions (usually on three axes) of the electronic device 100. When the electronic device 100 is still, a magnitude and a direction of gravity may be detected. The acceleration sensor 150A may be configured to identify a posture of the electronic device, and is used in applications such as switching between a landscape mode and a portrait mode or a pedometer.

The distance sensor 150B is configured to measure a distance. The electronic device 100 may measure the distance in an infrared manner or a laser manner. In some embodiments, in a photographing scenario, the electronic device 100 may measure a distance through the distance sensor 150B to implement quick focusing.

The optical proximity sensor 150C may include, for example, a light emitting diode (LED) and an optical detector, for example, a photodiode. The light emitting diode may be an infrared light emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 150C, that a user holds the electronic device 100 close to an ear for a call, to automatically turn off a display for power saving. The optical proximity sensor 150C may also be used in a smart cover mode or a pocket mode to automatically perform screen unlocking or locking.

The temperature sensor 150D is configured to detect a temperature. In some embodiments, the electronic device 100 executes a temperature processing policy through the temperature detected by the temperature sensor 150D. For example, when the temperature reported by the temperature sensor 150D exceeds a threshold, the electronic device 100 lowers performance of a processor nearby the temperature sensor 150D, to reduce power consumption for thermal protection. In some other embodiments, when the temperature is lower than another threshold, the electronic device 100 heats the battery to prevent the electronic device 100 from being shut down abnormally due to a low temperature. In some other embodiments, when the temperature is lower than still another threshold, the electronic device 100 boosts an output voltage of the battery to avoid abnormal shutdown caused by a low temperature.

The touch sensor 150E is also referred to as a "touch component". The touch sensor 150E may be disposed on the display 194, and the touch sensor 150E and the display 194 form a touchscreen, which is also referred to as a "touch screen". The touch sensor 150E is configured to detect a touch operation performed on or near the touch sensor. The touch sensor may transfer the detected touch operation to the application processor to determine a type of a touch event. A visual output related to the touch operation may be provided on the display 194. In some other embodiments, the touch sensor 150E may also be disposed on a surface of the electronic device 100 at a location different from that of the display 194.

It should be noted that the electronic device 100 may also include other sensors, or the electronic device 100 may not include the foregoing one or more sensors.

The button 190 includes a power button, a volume button, and the like. The button 190 may be a mechanical button, or may be a touch button. The electronic device 100 may receive a button input, and generate a button signal input related to user setting and function control of the electronic device 100.

The motor 191 may generate a vibration prompt. The motor 191 may be configured to provide an incoming call vibration prompt and touch vibration feedback. For example, touch operations performed on different applications (for example, audio playing) may correspond to different vibration feedback effect. The motor 191 may also correspond to different vibration feedback effect for touch operations performed on different areas of the display 194. Different application scenarios (for example, a time reminder, an alarm clock, and a game) may also correspond to different vibration feedback effect. Touch vibration feedback effect may be customized.

The indicator 192 may be an indicator light, and may be configured to indicate a charging status and a power change, or may be configured to indicate a message, a notification, and the like.

The following describes diagrams of layouts of the loudspeakers on the electronic device 100.

Figure 2:
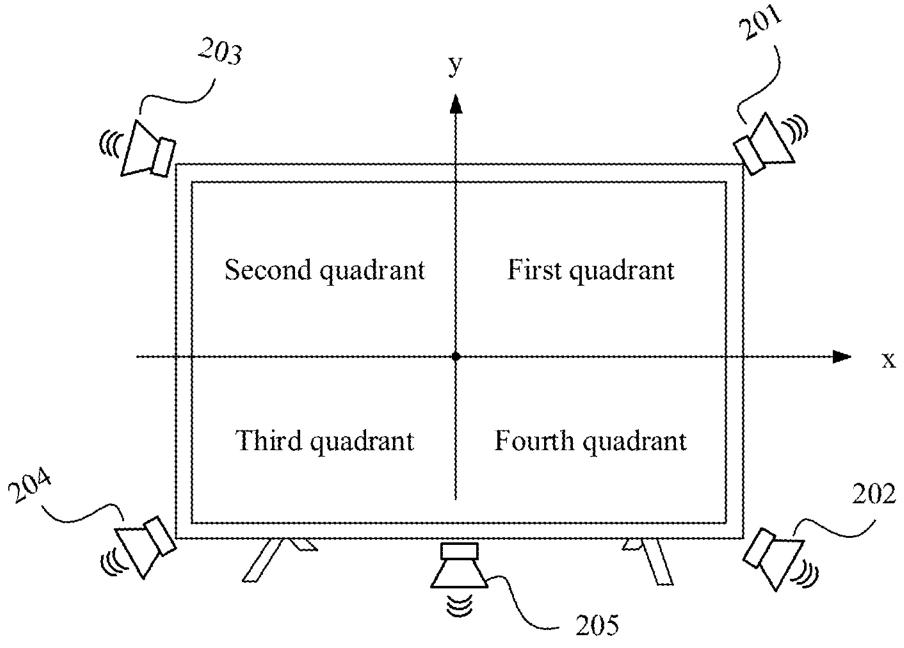
FIG. 2 is a diagram of locations of a plurality of loudspeakers on an electronic device according to an embodiment of this application.

FIG. 2 is a diagram of locations of a plurality of loudspeakers on an electronic device 100 on the electronic device 100.

As shown in FIG. 2, a rectangular coordinate system is established by using a center point of a display of the electronic device 100 as an origin, a horizontal rightward direction as an x axis, and an upward direction perpendicular to the horizontal direction as a y-axis direction. Space between a positive x-axis direction and a positive y-axis direction is a first quadrant, space between a negative x-axis direction and the positive y-axis direction is a second quadrant, space between the negative x-axis direction and a negative y-axis direction is a third quadrant, and space between the positive x-axis direction and the negative y-axis direction is a fourth quadrant.

Only when there are loudspeakers in at least two different position directions on the electronic device 100, can a sound-making location of a target sound-making object in a video change with a location of the target sound-making object on the display. An embodiment of this application is described by using an example in which the electronic device 100 has loudspeakers in five different position directions. It should be noted that, different devices have different quantities and position directions of the loudspeakers. This is not limited in embodiments of this application.

For example, the five loudspeakers on the electronic device 100 are respectively a loudspeaker 201, a loudspeaker 202, a loudspeaker 203, a loudspeaker 204, and a loudspeaker 205. The loudspeaker 201 is located in the first quadrant, that is, the loudspeaker 201 is located in the right front of the electronic device 100, and therefore the loudspeaker 201 may also be referred to as a right front loudspeaker. The loudspeaker 203 is located in the second quadrant, that is, the loudspeaker 203 is located in the left front of the electronic device 100, and therefore the loudspeaker 203 may also be referred to as a left front loudspeaker. The loudspeaker 204 is located in the third quadrant, that is, the loudspeaker 204 is located on the lower left of the electronic device 100, and therefore the loudspeaker 204 may also be referred to as a lower left loudspeaker. The loudspeaker 202 is located in the fourth quadrant, that is, the loudspeaker 202 is located in the lower right of the electronic device 100, and therefore the loudspeaker 202 may also be referred to as a lower right loudspeaker. The loudspeaker 205 may be located at the origin, namely, at an intersection point of an x axis and a y axis, or the loudspeaker 205 is located in a center of a display of the electronic device 100, and therefore the loudspeaker 205 may also be referred to as a center loudspeaker.

The loudspeaker 201 may play audio output by a right front sound channel, the loudspeaker 202 may play audio output by a lower right sound channel, the loudspeaker 203 may play audio output by a left front sound channel, the loudspeaker 204 may play audio output by a left rear sound channel, and the loudspeaker 205 may play audio output by a center sound channel.

The loudspeaker 201, the loudspeaker 202, the loudspeaker 203, the loudspeaker 204, and the loudspeaker 205 are respectively located in different position directions. After the location of the target sound-making object on the display of the electronic device 100 changes, the electronic device 100 may output audio of the target sound-making object via a different loudspeaker, so that the sound-making location (namely, a sound-making position of the loudspeaker) of the target sound-making object changes with the location of the target sound-making object, thereby achieving "sound following picture" effect.

It should be noted that the loudspeaker 201, the loudspeaker 202, the loudspeaker 203, the loudspeaker 204, and the loudspeaker 205 may be located behind the display of the electronic device 100, or the loudspeaker 201, the loudspeaker 202, the loudspeaker 203, the loudspeaker 204, and the loudspeaker 205 may be located at edges of the display of the electronic device 100. This is not limited in embodiments of this application.

In addition to the foregoing five position directions, the electronic device 100 may further classify the display of the electronic device 100 into more different position directions. For example, the electronic device 100 may continue to classify the second quadrant, and classify the second quadrant into a first area and a second area. A sum of display areas of both the first area and the second area is a display area of the second quadrant. Based on this, the electronic device 100 may classify locations of the plurality of loudspeakers on the electronic device 100 into loudspeakers in more position directions.

Figure 3:
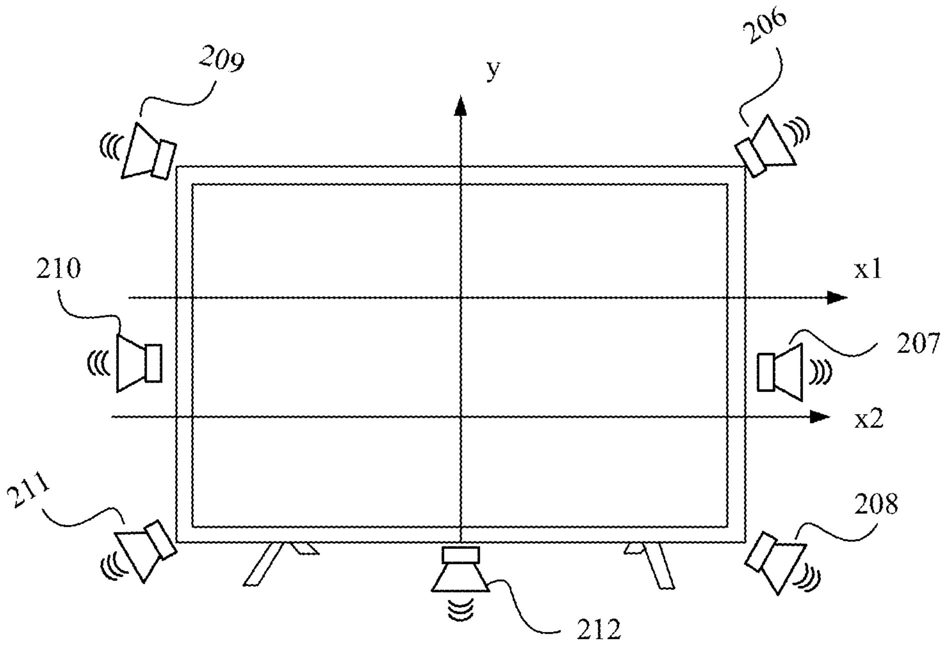
FIG. 3 is another diagram of locations of a plurality of loudspeakers on an electronic device according to an embodiment of this application.

FIG. 3 is another diagram of locations of a plurality of loudspeakers on the electronic device 100 on the electronic device 100.

As shown in FIG. 3, a center point of the display of the electronic device 100 is used as an origin, and an upward direction perpendicular to a horizontal direction is a y-axis direction. In the horizontal direction, the display of the electronic device 100 is classified into three areas, and an x1 axis and an x2 axis that are perpendicular to a y-axis are separately drawn. The x1 axis and the x2 axis classify a display area of the electronic device 100 into three equal areas in the horizontal direction. In FIG. 3, the y axis, the x1 axis, and the x2 axis classify the display area of the display of the electronic device 100 into six equally divided areas.

For example, seven loudspeakers on the electronic device 100 are respectively a loudspeaker 206, a loudspeaker 207, a loudspeaker 208, a loudspeaker 209, a loudspeaker 210, a loudspeaker 211, and a loudspeaker 212. The loudspeaker 206 is located in a display area on the right side of the y axis and above the x1 axis, and therefore the loudspeaker 206 may also be referred to as a right front loudspeaker. The loudspeaker 207 is located in a display area on the right side of the y axis, below the x1 axis, and above the x2 axis, and therefore the loudspeaker 206 may also be referred to as a right center loudspeaker. The loudspeaker 208 is located in a display area on the right side of the y axis and below the x2 axis, and therefore the loudspeaker 208 may also be referred to as a right rear loudspeaker. The loudspeaker 209 is located in a display area on the left side of the y axis and above the x1 axis, and therefore the loudspeaker 209 may also be referred to as a left front loudspeaker. The loudspeaker 210 is located in a display area on the left side of the y axis, below the x1 axis, and above the x2 axis, and therefore the loudspeaker 210 may also be referred to as a left center loudspeaker. The loudspeaker 211 is located in a display area on the left side of the y axis and below the x2 axis, and therefore the loudspeaker 211 may also be referred to as a left rear loudspeaker. The loudspeaker 212 is located in a center of the display of the electronic device 100, or the loudspeaker 212 is located between the loudspeaker 210 and the loudspeaker 211, and therefore the loudspeaker 212 may also be referred to as a center loudspeaker.

The loudspeaker 206 may play audio output by a right front sound channel, the loudspeaker 207 may play audio output by a right center sound channel, the loudspeaker 208 may play audio output by a right rear sound channel, the loudspeaker 209 may play audio output by a left front sound channel, the loudspeaker 210 may play audio output by a left center sound channel, the loudspeaker 211 may play audio output by a left rear sound channel, and the loudspeaker 212 may play audio output by a center sound channel.

It should be noted that the loudspeaker 206, the loudspeaker 207, the loudspeaker 208, the loudspeaker 209, the loudspeaker 210, the loudspeaker 211, and the loudspeaker 212 may be located behind the display of the electronic device 100, or the loudspeaker 206, the loudspeaker 207, the loudspeaker 208, the loudspeaker 209, the loudspeaker 210, the loudspeaker 211, and the loudspeaker 212 may be located at edges of the display of the electronic device 100. This is not limited in embodiments of this application.

In addition to methods of classifying position directions of the loudspeakers shown in FIG. 2 and FIG. 3, the electronic device 100 may further perform position direction classification on locations of loudspeakers on the electronic device 100 in any other manner. This is not limited in embodiments of this application.

In addition to making a sound via the loudspeaker on the electronic device 100, the electronic device 100 may also be externally connected to an audio output device (for example, a sound box). The electronic device 100 outputs, via a corresponding sound box, audio output via the loudspeaker, thereby improving volume and sound quality of the output audio. For example, in a home theater scenario or a movie watching scenario in a theater, a video sound played on a large display is output via a sound box. This can obtain better sound quality, and improve video watching experience of a user.

The following embodiment of this application is based on an implementation principle of "sound following picture" in a home theater scenario in which the electronic device 100 outputs the audio via a sound box.

Figure 4:
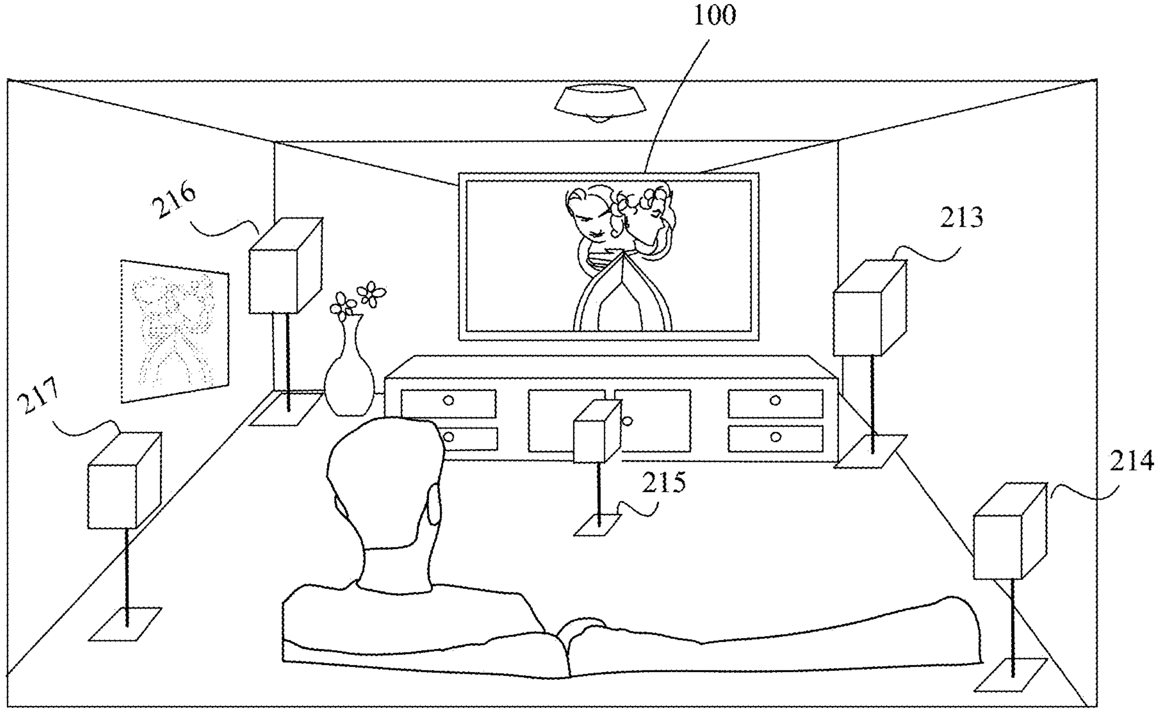
FIG. 4 is a diagram of outputting audio by an electronic device via externally connected sound boxes according to an embodiment of this application.

FIG. 4 is a diagram of an example in which the electronic device 100 outputs the audio via externally connected sound boxes.

The electronic device 100 may be connected to the sound box in a wired or wireless manner. The electronic device 100 may be externally connected to a plurality of sound boxes, and the plurality of sound boxes respectively correspond to different sound channels on the electronic device 100. In this way, the electronic device 100 can output audio of sound channels via the plurality of sound boxes.

For example, as shown in FIG. 4, the electronic device 100 may be connected to five sound boxes. The five sound boxes are a sound box 213, a sound box 214, a sound box 215, a sound box 216, and a sound box 217. The sound box 213 may be configured to output audio output by a right front sound channel, the sound box 214 may be configured to output audio output by a right rear sound channel, the sound box 215 may be configured to output audio output by a center sound channel, the sound box 216 may be configured to output audio output by a left front sound channel, and the sound box 217 may be configured to output audio output by a left rear sound channel.

In this way, after the electronic device 100 is connected to the sound box 213, the sound box 214, the sound box 215, the sound box 216, and the sound box 217, the electronic device 100 may not output the audio via the loudspeaker 201, the loudspeaker 202, the loudspeaker 203, the loudspeaker 204, and the loudspeaker 205. When the electronic device 100 outputs the audio through the right front sound channel, the electronic device 100 first detects whether a sound box is connected to the right front sound channel. If the sound box is connected, the electronic device 100 outputs the audio via the sound box 213 instead of the loudspeaker 201. When the electronic device 100 outputs the audio through the right rear sound channel, the electronic device 100 first detects whether a sound box is connected to the right rear sound channel. If the sound box is connected, the electronic device 100 outputs the audio via the sound box 214 instead of the loudspeaker 202. When the electronic device 100 outputs the audio through the left front sound channel, the electronic device 100 first detects whether a sound box is connected to the left front sound channel. If the sound box is connected, the electronic device 100 outputs the audio via the sound box 216 instead of the loudspeaker 203. When the electronic device 100 outputs the audio through the left rear sound channel, the electronic device 100 first detects whether a sound box is connected to the left rear sound channel. If the sound box is connected, the electronic device 100 outputs the audio via the sound box 217 instead of the loudspeaker 204. When the electronic device 100 outputs the audio through the center sound channel, the electronic device 100 first detects whether a sound box is connected to the center sound channel. If the sound box is connected, the electronic device 100 outputs the audio via the sound box 215 instead of the loudspeaker 205.

It should be noted that the electronic device 100 may be connected to more other sound boxes, and output audio of more different sound channels via the more other sound boxes. This is not limited in embodiments of this application.

The following describes function modules, of the electronic device 100 provided in this embodiment of this application, for implementing that the sound-making location of the target sound-making object in the video changes with the location of the target sound-making object on the display.

Figure 5:
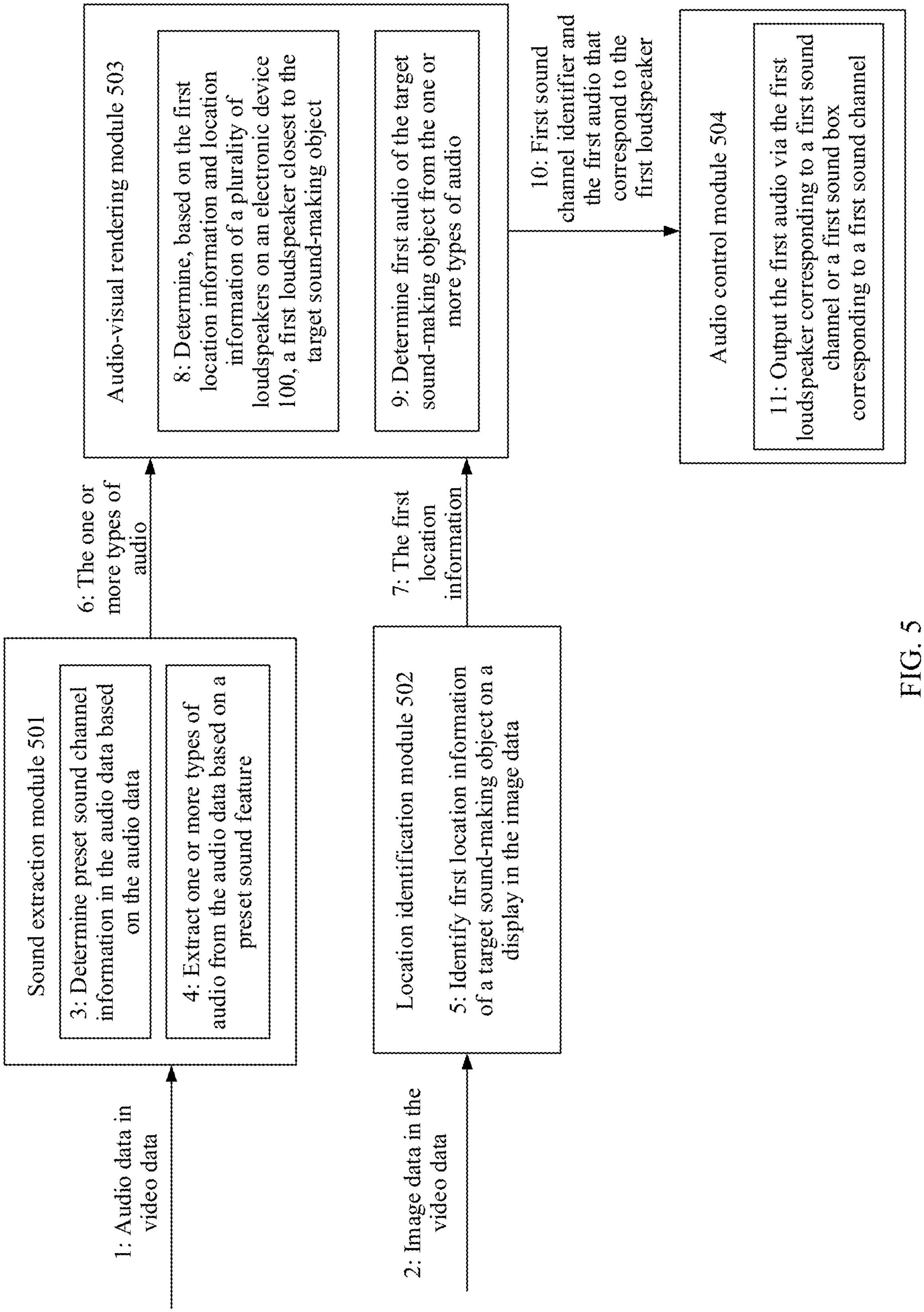
FIG. 5 is a diagram of function modules of an electronic device according to an embodiment of this application.

FIG. 5 is a diagram of an example of function modules of the electronic device 100.

The function modules include but are not limited to a sound extraction module 501, a location identification module 502, an audio-visual rendering module 503, and an audio control module 504.

Optionally, video data may be preprocessed before audio data is input into the sound extraction module 501 and image data is input into the location identification module 502. That is, the video data is processed into the video data in a preset format, so that the sound extraction module 501 and the location identification module 502 can perform processing on the data in the preset format. For example, the preprocessing includes multi-channel downmixing, data frame splicing, and short-time Fourier transform operations. Downmixing is performed on both stereo and multi-channel inputs to a dual-channel, to ensure object-based left and right sound images. In data frame splicing, an input time domain sequence of an AI audio model is constructed based on a historical buffer, current buffer, and future buffer.

The sound extraction module 501 is configured to obtain the audio data in the video data. After obtaining the audio data, the sound extraction module 501 is further configured to identify preset sound channel information in the audio data based on the audio data. For example, if it is preset that the audio data is output by two sound channels (for example, a left sound channel and a right sound channel), the preset sound channel information in the audio data includes the left sound channel and the right sound channel, audio data output by the left sound channel, and audio output by the right sound channel.

The sound extraction module 501 is further configured to extract one or more types of audio from the audio data based on a preset sound feature. The one or more types of audio include but are not limited to a human sound, an animal sound, an ambient sound, a music sound, an object sound, and the like. That is, the audio data obtained by the sound extraction module 501 is integrated with a plurality of different types of audio. The sound extraction module 501 separates the obtained audio data to obtain the plurality of types of audio. How the sound extraction module 501 extracts the one or more types of audio is described in detail in subsequent embodiments. Details are not described herein in this embodiment of this application.

The location identification module 502 is configured to obtain the image data in the video data. After the location identification module 502 obtains the image data in the video data, the location identification module 502 is further configured to identify first location information of the target sound-making object on the display in the image data. The target sound-making object may be a person, an animal, an object (for example, an airplane or a vehicle), or the like. The location identification module 502 may identify, based on an image identification algorithm, a location of the target sound-making object on the display in the image data. How the location identification module 502 identifies the location of the target sound-making object on the display in the image data is described in detail in subsequent embodiments. Details are not described herein in this embodiment of this application.

In some embodiments, the location identification module 502 may identify a plurality of target sound-making objects from the image data, and the location identification module 502 may obtain locations of the plurality of target sound-making objects on the display. The location identification module 502 may send the locations of the plurality of target sound-making objects on the display to the audio-visual rendering module 503.

After the sound extraction module 501 obtains the one or more types of audio, the sound extraction module 501 is further configured to send the one or more types of audio to the audio-visual rendering module 503.

After the location identification module 502 identifies the first location information of the target sound-making object on the display in the image data, the location identification module 502 is further configured to send the first location information of the target sound-making object on the display to the audio-visual rendering module 503.

The audio-visual rendering module 503 is configured to receive the one or more types of audio sent by the sound extraction module 501, and the audio-visual rendering module 503 is further configured to receive the first location information of the target sound-making object on the display that is sent by the location identification module 502.

The audio-visual rendering module 503 may further perform post-processing on the audio data, for example, inverse short-time Fourier transform, data smoothing, and merging an object sound channel into a source sound channel. Inverse short-time Fourier transform converts a time-spectrum back to a time-domain signal. Data smoothing can fade in and out signals between frames to remove a pop tone caused by a model strategy. Merging the object sound channel into the source sound channel is used to interleave the processed object sound channel with the source sound channel and then output.

Then, the audio-visual rendering module 503 is configured to determine, based on the first location information and location information of a plurality of loudspeakers on the electronic device 100, a first loudspeaker closest to the target sound-making object.

The audio-visual rendering module 503 is further configured to determine first audio of the target sound-making object from the one or more types of audio. If there are the plurality of target sound-making objects, the audio-visual rendering module 503 may determine, from the plurality of types of audio, a target sound-making object corresponding to each type of audio.

The audio-visual rendering module 503 is further configured to send, to the audio control module 504, a first sound channel identifier and the first audio that correspond to the first loudspeaker.

The audio control module 504 is configured to receive the first channel identifier and the first audio that correspond to the first loudspeaker and that are sent by the audio-visual rendering module 503. First, the audio control module 504 determines whether a first sound channel is connected to a sound box; and if the first sound channel is not connected to the sound box, the audio control module 504 outputs the first audio via the first loudspeaker corresponding to the first sound channel; or if the first sound channel is connected to the sound box, the audio control module 504 outputs the first audio via the first sound box corresponding to the first sound channel.

In this way, the audio of the target sound-making object can be output from a loudspeaker or a sound box closest to the target sound-making object based on the location of the target sound-making object on the display in the image data, so that the audio output location of the target sound-making object changes with the location of the target sound-making object on the display.

It should be noted that the sound extraction module 501, the location identification module 502, the audio-visual rendering module 503, and the audio control module 504 may be randomly combined to implement the foregoing functions, or the sound extraction module 501, the location identification module 502, the audio-visual rendering module 503, and the audio control module 504 may be separately used as one module to implement the foregoing functions. This is not limited in embodiments of this application.

The following describes in detail how the electronic device 100 extracts the one or more types of audio from the audio data. The one or more types of audio include but are not limited to a human sound, an animal sound, an ambient sound, a music sound, an object sound (for example, an airplane sound or a vehicle sound), and the like.

After the electronic device 100 obtains the audio data in the video data, the electronic device 100 extracts the one or more types of audio from the audio data.

In some embodiments, the electronic device 100 may obtain an audio extraction model through training in advance, and extract the one or more types of audio in the audio data in the video data by using the trained audio extraction model.

Before the electronic device 100 extracts the one or more types of audio from the audio data, the electronic device 100 needs to obtain one or more types of preset audio features.

TABLE 1

| Type | Audio feature |
|---|---|
| Human sound | V1 = [a1, a2, a3, a4, a5, a6 . . . , an] |
| Dog barking sound | V2 = [b1, b2, b3, b4, b5, b6 . . . , bn] |
| Wind sound | V3 = [c1, c2, c3, c4, c5, c6 . . . , cn] |
| Airplane sound | V4 = [d1, d2, d3, d4, d5, d6 . . . , dn] |
| Vehicle sound | V5 = [e1, e2, e3, e4, e5, e6 . . . , en] |
| Train sound | V6 = [f1, f2, f3, f4, f5, f6 . . . , fn] |

Table 1 shows an example of some types of audio features. The audio feature may include but is not limited to a tone, loudness, timbre, melody, and the like. After an audio feature of an audio is extracted, the audio feature of the audio may be represented by a feature vector.

Table 1 shows an example of vector representations of some types of audio features. The audio feature of the human sound may be represented by a feature vector V1, where V1=[a1, a2, a3, a4, a5, a6 . . . , an]. The audio feature of the dog barking sound may be represented by a feature vector V2, where V2=[b1, b2, b3, b4, b5, b6 . . . , bn]. The audio feature of the wind sound may be represented by a feature vector V3, where V3=[c1, c2, c3, c4, c5, c6 . . . , cn]. The audio feature of the airplane sound may be represented by a feature vector V4, where V4=[d1, d2, d3, d4, d5, d6 . . . , dn]. The audio feature of the vehicle sound may be represented by a feature vector V5, where V5-[e1, e2, e3, e4, e5, e6 . . . , en]. The audio feature of the train sound may be represented by a feature vector V6, where V6=[f1, f2, f3, f4, f5, f6 . . . , fn]. Other audio features of more types may be included. Details are not described herein in this embodiment of this application.

It should be noted that audio of a same type but with different attributes has different audio features.

For example, a human sound may be a female sound or a male sound according to a gender. According to an age, the human sound may be a sound of a person aged 0 to 5, a sound of a person aged 5 to 10, a sound of a person aged 10 to 15, a sound of a person aged 15 to 20, a sound of a person aged 20 to 25, a sound of a person aged 25 to 30, and the like. A human sound of a same type in different phases further has different audio features. Details are not described herein in this embodiment of this application.

A plurality of different types of audio, for example, the human sound, the animal sound, the ambient sound, the music sound, the object sound are integrated in the audio file in the video data, to form the complete audio file. The electronic device may separate the plurality of types of audio integrated in the audio file, to obtain the plurality of pieces of audio.

Then, the electronic device 100 separately extracts audio features of the plurality of pieces of audio, and compares the audio features of the plurality of pieces of audio with the preset audio features. When similarity is greater than a preset value (for example, 90%), the electronic device 100 may determine an audio type of the audio. For example, if similarity between an audio feature of one of the plurality of pieces of audio and the audio feature of the vehicle sound is 95%, and similarity between the audio feature of the audio and the audio feature of the human sound, the audio feature of the dog barking sound, the audio feature of the wind sound, and the audio feature of the vehicle sound is less than 90%, for example, the similarity is 20%, the electronic device 100 may determine that an audio type of the audio is the airplane sound.

It should be noted that the audio data in the video data may include the one or more types of audio, and the electronic device 100 may extract the different types of audio based on the foregoing method, that is, separate the different types of audio.

After the electronic device 100 extracts the plurality of different types of audio from the audio data in the video data, the electronic device 100 further needs to determine target sound-making objects of the plurality of different types of audio, and locations of the target sound-making objects on the display of the electronic device 100, that is, determine a location of a target sound-making object of each type of audio on the display of the electronic device 100.

The electronic device 100 may determine an image of the target sound-making object in the picture frame by using an image identification model.

First, the image identification model needs to be trained by using a large quantity of sample pictures. The sample pictures include a quantity of various types of pictures, for example, a portrait picture, an animal picture (for example, a dog picture), and an object picture (for example, an airplane picture or a vehicle picture). A training process is as follows: the sample picture is used as an input of the image identification model, and the image identification model outputs an image feature of the input sample picture. Then, the image feature, of the sample picture, output by the image identification model is compared with a preset image feature of the sample picture, and whether similarity between the two image features is greater than a preset value is observed. If the similarity is greater than the preset value, it indicates that the image identification model can accurately identify the feature of the picture, and training of the image identification model is completed. If the similarity is less than the preset value, the foregoing steps are repeated until the similarity between the image feature, of the sample picture, output by the image identification model and the preset image feature of the sample picture is greater than the preset value.

It should be noted that the image identification model may be trained by the electronic device 100, or the image identification model may be trained in a server, and the trained image identification model is sent to the electronic device 100. This is not limited in embodiments of this application.

TABLE 2

| Type | Image feature |
|---|---|
| Facial image | F1 = [A1, A2, A3, A4, A5, A6 . . . , An] |
| Dog image | F2 = [B1, B2, B3, B4, B5, B6 . . . , Bn] |
| Airplane image | F3 = [C1, C2, C3, C4, C5, C6 . . . , Cn] |
| Vehicle image | F4 = [D1, D2, D3, D4, D5, D6 . . . , Dn] |
| Train image | F5 = [E1, E2, E3, E4, E5, E6 . . . , En] |

Table 2 shows an example of some types of image features. The image feature may include but is not limited to a color feature, a texture feature, a contour feature, and the like. After an image feature of an image is extracted, the image feature of the image may be represented by a feature vector.

Table 2 shows an example of vector representation of some types of image features. The image feature of the facial image may be represented by a feature vector F1, where F1=[A1, A2, A3, A4, A5, A6 . . . , An]. The image feature of a dog may be represented by a feature vector F2, where F2=[B1, B2, B3, B4, B5, B6 . . . , Bn]. The image feature of the airplane image may be represented by a feature vector F3, where F3=[C1, C2, C3, C4, C5, C6 . . . , Cn]. The image feature of the vehicle image may be represented by a feature vector F4, where F4=[D1, D2, D3, D4, D5, D6 . . . , Dn]. The image feature of the train image may be represented by a feature vector F5, where F5=[E1, E2, E3, E4, E5, E6 . . . , En]. Other image features of more types may be included. Details are not described herein in this embodiment of this application.

It should be noted that an image of a same type but with different attributes has different image features.

For example, a facial image may be a female image or a male image according to a gender. According to an age, the facial image may be a facial image of a person aged 0 to 5, a facial image of a person aged 5 to 10, a facial image of a person aged 10 to 15, a facial image of a person aged 15 to 20, a facial image of a person aged 20 to 25, a facial image of a person aged 25 to 30, or the like. A facial image of a same type in different phases further has different image features. Details are not described herein in this embodiment of this application.

The image data in the video data may include a plurality of types of images, for example, a facial image, an animal image, a vehicle image, an airplane image, and a train image. The electronic device 100 needs to identify the plurality of types of images from the image data, and determine the target sound-making object from the plurality of types of images.

For example, the electronic device 100 may identify images of preset types in the image data, that is, determine the target sound-making objects, by using the image identification model.

The electronic device 100 separately extracts the image features from the image data, and compares the image features with preset image features. When similarity is greater than a preset value (for example, 90%), the electronic device 100 may determine an image type of the image data. For example, if similarity between an image feature of an image in the image data and the image feature of the vehicle image is 95%, and similarity between the image feature of the image and the image feature of the facial image, the image feature of the animal (full) image, and the image feature of the train image is less than 90%, for example, the similarity is 20%, the electronic device 100 may determine that an image type of the image is a train.

In some embodiments, after the electronic device 100 separates the plurality of types of audio from the video data, for example, a first audio of a first type (for example, audio of a human sound). The electronic device 100 needs to track, from the image data of the video data, a sound-making object corresponding to the first audio. The electronic device 100 determines an image of a first type based on the first type of the first audio, and the electronic device 100 finds an image feature of the first type from the plurality of preset image features. Then, the electronic device 100 extracts features of a plurality of images in the image data of the video data, matches the extracted image features of the plurality of pieces of image data of the video data with the preset image feature of the first type, and finds a location of the image of the first type in the image. In this way, the electronic device 100 only needs to match the extracted image features of the plurality of images in the image data of the video data with the image feature of the first type (that is, determine whether similarity is greater than the preset value), and does not need to match the image features with all the plurality of preset image features. This can reduce time for the electronic device 100 to determine the location of image of the first type in the image. For example, if the type of the first audio is a human sound, the electronic device 100 needs to determine a location of a person in an image from the image data of the video data. The electronic device 100 finds an image feature of the person from the plurality of types of preset image features, and the electronic device 100 extracts the features of the plurality of images in the image data of the video data, matches the extracted image features of the plurality of pieces of image data of the video data with the image feature of the person, and determines the location of the image of the person in the image. In this way, the electronic device 100 only needs to match the image features of the plurality of pieces of image data of the video data with the image feature of the person, and does not need to match the image features of the plurality of pieces of image data of the video data with the plurality of preset image features of the images (for example, the image feature of the animal or the image feature of the object). This can reduce time for the electronic device 100 to determine the location of image of the person in the image.

In another embodiment, after the electronic device 100 separates the plurality of types of audio from the video data, for example, a first audio of a first type (for example, audio of a human sound). The electronic device 100 needs to track, from the image data of the video data, a sound-making object corresponding to the first audio. The electronic device 100 may extract features of a plurality of images in the image data of the video data, and obtain a plurality of types of preset image features. The electronic device 100 matches the image features of the plurality of images in the image data of the video data with the plurality of types of preset image features, and determines a type of each of the images and a location of each of the images. Then, the electronic device 100 determines, from the type of each of the images, an image type of the sound-making object corresponding to the first audio, and further determines the location of the image of the sound-making object corresponding to the first audio in the image.

Alternatively, the location of the image of the sound-making object in the image may be determined in another manner. This is not limited in embodiments of this application.

In another embodiment, the electronic device 100 may first identify an image feature of the target sound-making object in the image data, and then determine a type of the target sound-making object and a location of the target sound-making object in the image. Then, the electronic device 100 separates audio of a corresponding type from the audio data of the video data based on the type of the target sound-making object. For example, the electronic device 100 first identifies an image of a person in the image data and a location of the person in the image, and determines that the person is making a sound. Then, the electronic device 100 extracts, based on a case that a type of the target sound-making object is the person, audio output by the person from the audio data of the video data, and outputs the audio of the person from a corresponding sound channel based on the location of the person in the image.

After the electronic device 100 obtains the image type in the image data, the electronic device 100 may determine the target sound-making object in the image data. The target sound-making object includes but is not limited to a person, an animal, an object, and the like.

In the image data of the video data, there are usually images of a plurality of different target sound-making objects. Each target sound-making object corresponds to output audio. The electronic device 100 further needs to map an image feature of each target sound-making object to an audio feature of output audio of the target sound-making object in a one-to-one correspondence, so that the electronic device 100 can track a location of an image of the target sound-making object on the electronic device 100 and an output location of the audio output by the target sound-making object.

The electronic device 100 extracts an image feature and an audio feature of the target sound-making object (for example, a first target object); the electronic device 100 determines, based on a preset image feature of an image and the image feature of the first target object, that similarity is greater than a preset value; and the electronic device 100 determines an image type of the first target object. The electronic device 100 further needs to determine, based on a preset audio feature of a type of audio and the audio feature of the first target object, that similarity is greater than a preset value; and the electronic device 100 determines an audio type of the first target object. If the image type of the first target object and the audio type of the first target object are a same type, for example, a facial image and a human sound respectively, the electronic device 100 establishes a one-to-one binding relationship between the audio feature and the image feature of the first target object. Then, the electronic device 100 may track a display location of the first target object on the display in subsequently output image data and audio data, and output audio of the first target object at a corresponding location. If the electronic device 100 identifies a new target sound-making object in the subsequently output image data and audio data, and both an audio feature and an image feature of the new target sound-making object are different from an audio feature of a previous target sound-making object, the electronic device 100 may determine that the new target sound-making object appears. The electronic device 100 establishes a one-to-one binding relationship between the audio feature and the image feature of the new target sound-making object; and tracks a display location of the new target sound-making object on the display, and outputs audio of the corresponding target sound-making object at a corresponding location. By analogy, the electronic device 100 may track, on the display, a location of each target sound-making object in video data, and output audio of the target sound-making object at a corresponding location.

TABLE 3

| Type of a target sound-making object | Image feature of the target sound-making object | Audio feature of the target sound-making object |
|---|---|---|
| Person | F1 = [A1, A2, A3, A4, A5, A6 . . . , An] | V1 = [a1, a2, a3, a4, a5, a6 . . . , an] |
| Animal (dog) | F2 = [B1, B2, B3, B4, B5, B6 . . . , Bn] | V2 = [b1, b2, b3, b4, b5, b6 . . . , bn] |

TABLE 3-continued

| Type of a target sound-making object | Image feature of the target sound-making object | Audio feature of the target sound-making object |
|---|---|---|
| Vehicle | F4 = [D1, D2, D3, D4, D5, D6 . . . , Dn] | V5 = [e1, e2, e3, e4, e5, e6 . . . , en] |
| Airplane | F3 = [C1, C2, C3, C4, C5, C6 . . . , Cn] | V4 = [d1, d2, d3, d4, d5, d6 . . . , dn] |
| Train | F5 = [E1, E2, E3, E4, E5, E6 . . . , En] | V6 = [f1, f2, f3, f4, f5, f6 . . . , fn] |

Table 3 shows an example of a binding relationship between the image feature and the audio feature of the target sound-making object and the identified target sound-making object when the electronic device 100 plays video data. When the target sound-making object is the person, the image feature of the person is F1=[A1, A2, A3, A4, A5, A6 . . . , An], and the audio feature of the person is V1=[a1, a2, a3, a4, a5, a6 . . . , an], the electronic device 100 establishes the one-to-one binding relationship between F1 and V1. When the target sound-making object is the animal (dog), the image feature of the animal (dog) is F2=[B1, B2, B3, B4, B5, B6 . . . , Bn], and the audio feature of the animal (dog) is V2=[b1, b2, b3, b4, b5, b6 . . . , bn], the electronic device 100 establishes the one-to-one binding relationship between F2 and V2. When the target sound-making object is the vehicle, the image feature of the vehicle is F4=[D1, D2, D3, D4, D5, D6 . . . , Dn], and the audio feature of the vehicle is V5=[e1, e2, e3, e4, e5, e6 . . . , en], the electronic device 100 establishes the one-to-one binding relationship between F4 and V5. When the target sound-making object is the airplane, the image feature of the airplane is F3=[C1, C2, C3, C4, C5, C6, . . . , Cn], and the audio feature of the vehicle is V4=[d1, d2, d3, d4, d5, d6, . . . , dn], the electronic device 100 establishes the one-to-one binding relationship between F3 and V4. When the target sound-making object is the train, the image feature of the train is F5=[E1, E2, E3, E4, E5, E6, . . . , En], and the audio feature of the train is V6=[f1, f2, f3, f4, f5, f6, . . . , fn], the electronic device 100 establishes the one-to-one binding relationship between F5 and V6.

It should be noted that, for persons, an image feature and an audio feature are different for the persons with different attributes. For example, an image feature of a male is different from an image feature of a female, and an audio feature of the male is also different from an audio feature of the female. In this way, the electronic device 100 can also distinguish between the persons with the different attributes.

The electronic device 100 tracks a location of an image of the target sound-making object on the display, that is, determines a change of a location of the target sound-making object on the display, so as to determine a loudspeaker closest to the location of the target sound-making object on the display, and output audio corresponding to the target sound-making object via the closest loudspeaker.

The following describes how the electronic device 100 determines the location of the image of the target sound-making object (for example, a person 1) on the display.

The electronic device 100 identifies a contour of the target sound-making object, and determines the location of the target sound-making object on the display based on the contour of the target sound-making object.

For example, for a person and an animal, the person and the animal make a sound based on lips, and the electronic device 100 may identify a contour of a head image of the person or the animal based on an algorithm. Further, the electronic device 100 may determine the lip location from the contour of the head image of the person or the animal. After determining the lip location, the electronic device 100 may determine a location of the lip location on the display of the electronic device 100.

For example, for another object, like a train, a vehicle, or an airplane, the electronic device 100 may identify a contour of the object based on an algorithm. Further, the electronic device 100 determines a center point of the contour of the object based on the contour of the object. The electronic device 100 may use the center point as a sound-making part of the object. After determining the sound-making part, the electronic device 100 may determine a location of the sound-making part of the object on the display of the electronic device 100. In addition to using the center point of the contour of the object as the sound-making part of the object, the electronic device 100 may also determine the sound-making part of the object in another manner. This is not limited in embodiments of this application.

Figure 6:
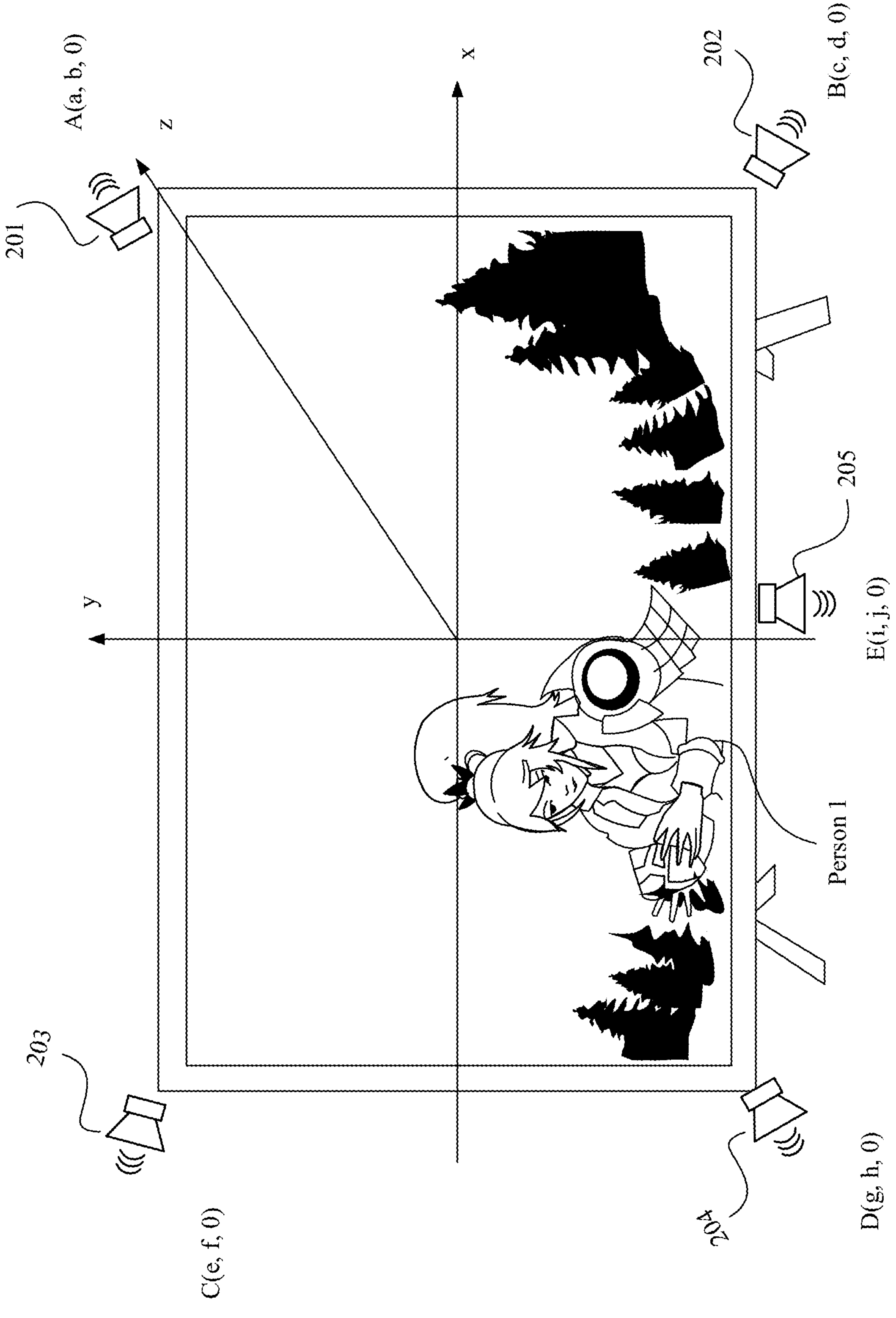
FIG. 6 and FIG. 7 are diagrams of how to determine a location of a person on a display according to an embodiment of this application.
Figure 7:
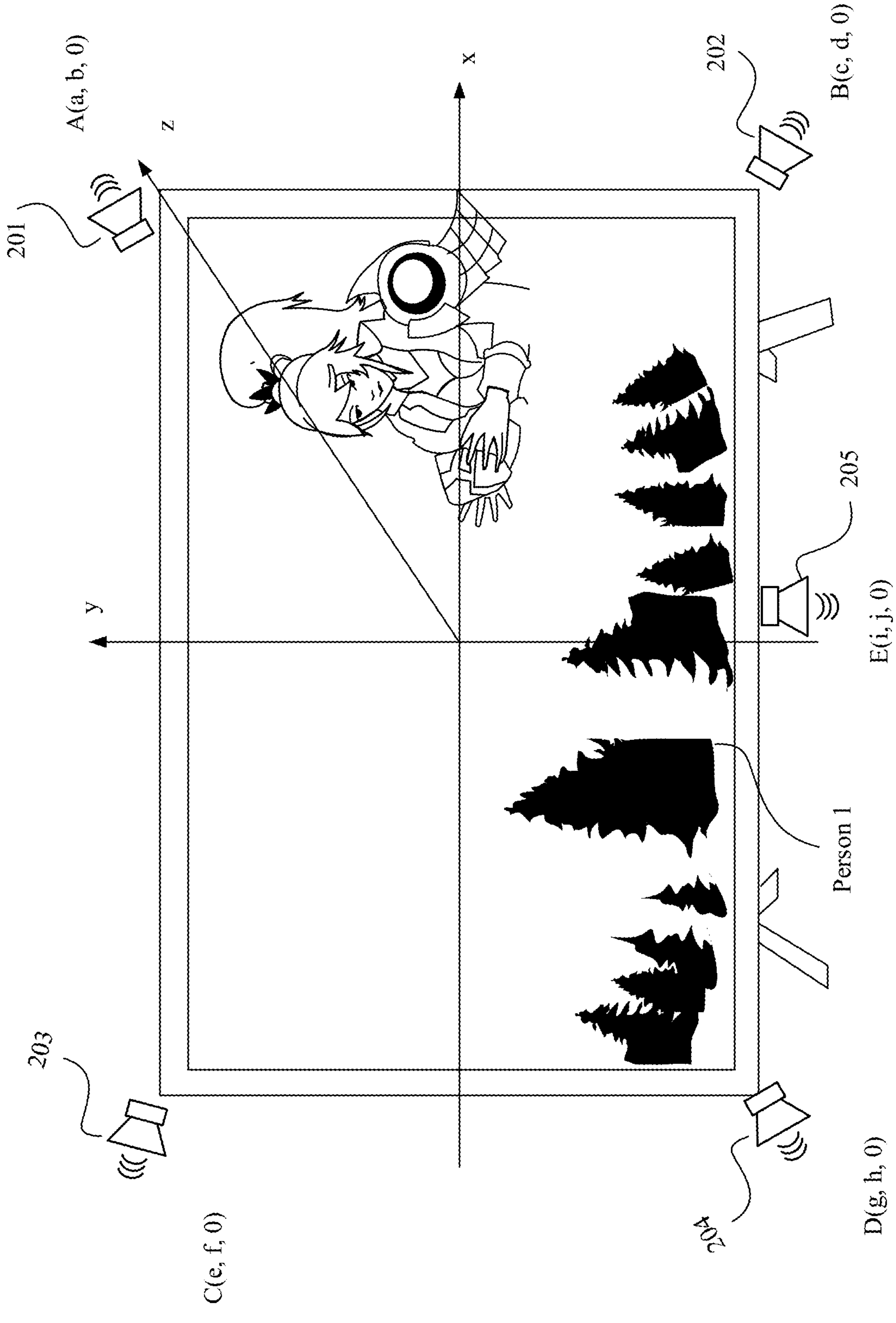

FIG. 6 and FIG. 7 each are a diagram of an example of how to determine a location of a person 1 on a display.

Optionally, a three-dimensional coordinate system is established by using a center point of the electronic device 100 as an origin, a horizontal direction rightward as a positive direction of an x axis, a direction upward and perpendicular to the x axis as a positive direction of a y axis, and a direction perpendicular to an inward direction of the display as a positive direction of a z axis, to determine the location of the person 1 on the display of the electronic device 100.

It should be noted that, locations of loudspeakers on the electronic device 100 are specific on the electronic device 100. Therefore, the electronic device 100 can obtain location information of a plurality of loudspeakers on the electronic device 100. For example, in an embodiment of this application, the locations of the loudspeakers described in FIG. 2 are used as an example to describe how to determine the location of the person 1 on the display, but this should not constitute a limitation.

As shown in FIG. 6, it is assumed that a width of the display of the electronic device 100 is M, and a height of the display is N. The loudspeaker 201 is in the first quadrant, and location coordinates of the loudspeaker 201 may be represented as A(a, b, 0), where a is greater than 0 and less than M, and b is greater than 0 and less than N. The loudspeaker 202 is in the fourth quadrant, and location coordinates of the loudspeaker 202 may be represented as B(c, d, 0), where c is greater than 0 and less than M, and d is greater than −N and less than 0. The loudspeaker 203 is in the second quadrant, and location coordinates of the loudspeaker 203 may be represented as C(e, e, 0), where e is greater than −M and less than 0, and d is greater than 0 and less than N. The loudspeaker 204 is in the third quadrant, and location coordinates of the loudspeaker 204 may be represented as D(g, h, 0), where g is greater than −M and less than 0, and h is greater than −N and less than 0. The loudspeaker 205 is located at the origin, and location coordinates of the loudspeaker 205 may be represented as E(i, j, 0), where i is equal to 0 and j is equal to 0.

As shown in FIG. 6, at a first moment, the electronic device 100 may identify a head contour of the person 1, and determine coordinates of a sound-making part (for example, coordinates of the lip) based on the head contour of the person 1. It is assumed that the coordinates of the sound-making part of the person 1 are F1(o, p, q). For example, o is greater than −M and less than 0, p is greater than −N and less than 0, and q is greater than 0.

The electronic device 100 may determine, based on the coordinates F1 of the sound-making part of the person 1 and location coordinates of each loudspeaker, a distance between the sound-making part of the person 1 and each loudspeaker.

For example, if the electronic device 100 determines that a distance between the sound-making part of the person 1 and the loudspeaker 201 is r1, the electronic device 100 determines that a distance between the sound-making part of the person 1 and the loudspeaker 202 is r2, the electronic device 100 determines that a distance between the sound-making part of the person 1 and the loudspeaker 203 is r3, the electronic device 100 determines that a distance between the sound-making part of the person 1 and the loudspeaker 204 is r4, and the electronic device 100 determines that a distance between the sound-making part of the person 1 and the loudspeaker 205 is r5, and $r5<r4<r3<r2<r1$, the electronic device 100 determines that the distance between the sound-making part of the person 1 and the loudspeaker 205 is the closest, and the electronic device 100 determines that audio corresponding to the person 1 is output via the loudspeaker 205 at the first moment.

As shown in FIG. 7, because the person 1 changes in real time, for example, at a second moment, the person 1 moves to a location shown in FIG. 7, the electronic device 100 may identify the head contour of the person 1, and determine coordinates of the sound-making part (for example, coordinates of the lip) based on the head contour of the person 1. It is assumed that the coordinates of the sound-making part of the person 1 are F2(u, v, w). For example, u is greater than 0 and less than M, v is greater than 0 and less than N, and q is greater than 0.

The electronic device 100 may determine, based on the coordinates F2 of the sound-making part of the person 1 and location coordinates of each loudspeaker, a distance between the sound-making part of the person 1 and each loudspeaker.

For example, if the electronic device 100 determines that a distance between the sound-making part of the person 1 and the loudspeaker 201 is r6, the electronic device 100 determines that a distance between the sound-making part of the person 1 and the loudspeaker 202 is r7, the electronic device 100 determines that a distance between the sound-making part of the person 1 and the loudspeaker 203 is r8, the electronic device 100 determines that a distance between the sound-making part of the person 1 and the loudspeaker 204 is r9, and the electronic device 100 determines that a distance between the sound-making part of the person 1 and the loudspeaker 205 is r10, and $r6<r10<r7<r8<r9$, the electronic device 100 determines that the distance between the sound-making part of the person 1 and the loudspeaker 201 is the closest, and the electronic device 100 determines that audio corresponding to the person 1 is output via the loudspeaker 201 at the second moment.

The following describes how the electronic device 100 outputs the audio of the target sound-making object via the closest loudspeaker.

It can be learned from the foregoing embodiment that, after the electronic device 100 obtains the audio data in the video data, the electronic device 100 obtains the preset sound channel information in the audio data.

TABLE 4

| Sound channel information | Type of audio output by a sound channel |
|---|---|
| Left center sound channel | Ambient sound + Music |
| Right center sound channel | Ambient sound + Music |
| Center sound channel | Audio of a first target sound-making object |

Table 4 shows an example of the preset sound channel information and the type of the audio output by each sound channel in the audio data that are obtained by the electronic device. For example, the preset sound channel information includes the left center sound channel, the right center sound channel, and the center sound channel. The left center sound channel outputs the ambient sound and music, the right center sound channel also outputs the ambient sound and music, and the center sound channel outputs the audio of the first target sound-making object. The audio of the first target sound-making object is audio extracted by the electronic device 100 from the audio data. For example, the audio of the first target sound-making object may be audio made by a person. In other words, the electronic device 100 outputs, from the default center sound channel, the audio made by the person.

The preset sound channel information shown in Table 4 may be referred to as 2D audio information. The 2D audio information indicates a sound channel through which each type of audio is output, and is preset. The electronic device 100 cannot change, based on the change of the location of the target sound-making object on the display, a sound channel for outputting the audio of the target sound-making object. The user feels that the audio of the target sound-making object is output from a specific location, and does not sense a sound change in space. For example, the audio of the first target sound-making object is preset to be output from the center sound channel. If a location of the first target sound-making object on the display changes in real time in a video picture output by the electronic device 100, the electronic device 100 cannot output the audio of the first target sound-making object from the left center sound channel or the right center sound channel. The user feels that the audio of the first target sound-making object is output from the specific location, and does not sense the sound change in the space.

It should be noted that the electronic device 100 may further extract more other types of audio from the audio data, for example, audio made by an animal or audio made by an object. The audio made by the person is used as an example for description herein, and should not constitute a limitation.

Then, after the electronic device 100 extracts one or more types of audio from the audio data, for example, the audio of the first target sound-making object, audio to be output by the first target sound-making object at a first moment is first audio. After the electronic device 100 determines the location of the first target sound-making object on the display, the electronic device 100 determines a first loudspeaker closest to the first target sound-making object, and the electronic device 100 may determine, based on the first loudspeaker, a first sound channel identifier corresponding to the first loudspeaker.

Then, the electronic device 100 loads the first audio to a corresponding first sound channel. First, the electronic device 100 determines whether the first sound channel is connected to a sound box; and if the first sound channel is not connected to the sound box, the electronic device 100 outputs the first audio via the first loudspeaker corresponding to the first sound channel; or if the first sound channel is connected to the sound box, the electronic device 100 outputs the first audio via the first sound box corresponding to the first sound channel. For example, the first sound channel may be a left rear sound channel.

When the electronic device 100 outputs the first audio, the electronic device 100 outputs another audio (for example, a background sound or a music sound) and the like from preset sound channels.

TABLE 5

| Sound channel information | Type of audio output by a sound channel |
|---|---|
| Left center sound channel | Ambient sound + Music |
| Right center sound channel | Ambient sound + Music |
| Center sound channel | |
| Left rear sound channel | First audio |

Table 5 shows an example of outputting, by the electronic device 100 at the first moment based on the location of the first target sound-making object on the display, the first audio from the left rear sound channel corresponding to the closest first loudspeaker.

The electronic device 100 still outputs the ambient sound and the music from the preset left center sound channel and the preset right center sound channel. At the first moment, if the first target sound-making object is closest to the first loudspeaker, the electronic device 100 may output the first audio from the left rear sound channel corresponding to the first loudspeaker. In this case, the electronic device 100 no longer outputs the first audio from the preset center sound channel.

In some embodiments, at the first moment, the electronic device 100 outputs the audio of the target sound-making object via the first loudspeaker. The electronic device 100 detects the audio, of the target sound-making object, to be output at a third moment, but the electronic device 100 does not detect an image of the target sound-making object in the image data. In an implementation, the electronic device 100 may still output the audio of the target sound-making object via the first loudspeaker. If the electronic device 100 does not detect the image of the target sound-making object in the image data after a specific period of time or a specific image frame, the electronic device 100 may output the audio of the target sound-making object from a preset sound channel. For example, the preset sound channel may be the center sound channel. In another implementation, the electronic device 100 may directly output the audio of the target sound-making object from a preset sound channel. For example, the preset sound channel may be the center sound channel.

In some embodiments, at the first moment, if a quantity of target sound-making objects identified by the electronic device 100 is greater than a threshold (for example, 5), the electronic device 100 outputs audio of the plurality of target sound-making objects from a preset sound channel, and does not output the audio of the plurality of target sound-making objects via a closest loudspeaker or sound box based on locations of the plurality of target sound-making objects on the display.

Then, at a second moment, audio to be output by the first target sound-making object is second audio. After the electronic device 100 determines the location of the first target sound-making object on the display, the electronic device 100 determines a second loudspeaker closest to the first target sound-making object, and the electronic device 100 may determine, based on the second loudspeaker, a second sound channel identifier corresponding to the second loudspeaker.

Then, the electronic device 100 loads the second audio to a corresponding second channel. First, the electronic device 100 determines whether the second sound channel is connected to a sound box; and if the second sound channel is not connected to the sound box, the electronic device 100 outputs the second audio via the second loudspeaker corresponding to the second sound channel; or if the second sound channel is connected to the sound box, the electronic device 100 outputs the second audio via the second sound box corresponding to the second sound channel. For example, the second sound channel may be a right front sound channel.

When the electronic device 100 outputs the second audio, the electronic device 100 outputs another audio (for example, a background sound or a music sound) and the like from preset sound channels.

TABLE 6

| Sound channel information | Type of audio output by a sound channel |
|---|---|
| Left center sound channel | Ambient sound + Music |
| Right center sound channel | Ambient sound + Music |
| Center sound channel | |
| Left rear sound channel | |
| Right front sound channel | Second audio |

Table 6 shows an example of outputting, by the electronic device 100 at the second moment based on the location of the first target sound-making object on the display, the second audio from the left rear sound channel corresponding to the closest second loudspeaker.

The electronic device 100 still outputs the ambient sound and the music from the preset left center sound channel and the preset right center sound channel. At the second moment, if the first target sound-making object is closest to the second loudspeaker, the electronic device 100 may output the second audio from the right front sound channel corresponding to the second loudspeaker. In this case, the electronic device 100 no longer outputs the second audio from the preset center sound channel or left rear sound channel.

Audio output sound channel information shown in Table 5 and Table 6 may also be referred to as 3D audio information. The 3D audio information indicates sound channels through which some types of audio are output, and may change in real time. The electronic device 100 may change, based on the change of the location of the target sound-making object on the display, a sound channel for outputting the audio of the target sound-making object. The user feels that the audio of the target sound-making object is output from a different location, and senses a sound change in space. For example, the first audio output by the first target sound-making object shown in Table 5 is output from the left rear sound channel, and the second audio output by the first target sound-making object shown in Table 6 is output from the right front sound channel. In other words, as the location of the first target sound-making object on the display changes in real time, the electronic device 100 may change the audio output location of the first target sound-making object. The user feels that the audio of the first target sound-making object is output from the different location, and senses the sound change in the space.

The following describes, with reference to a scenario, how the electronic device 100 changes the audio output location of the target sound-making object based on the change of the location of the target sound-making object.

Figure 8A:
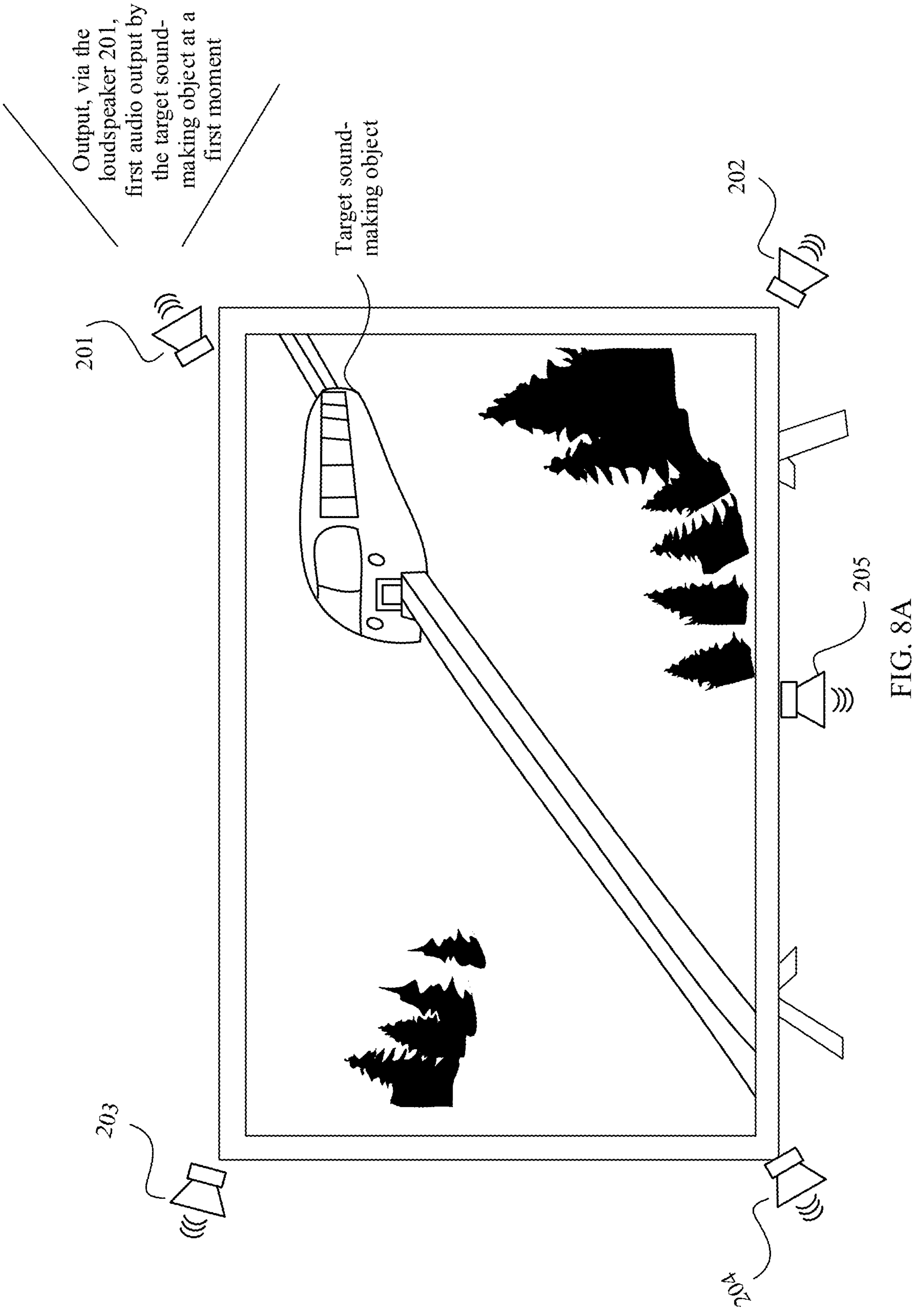
FIG. 8A to FIG. 8C are diagrams of examples in which an electronic device outputs audio of a target sound-making object via a different loudspeaker as a location of the target sound-making object+—for example, a train) changes.
Figure 8B:
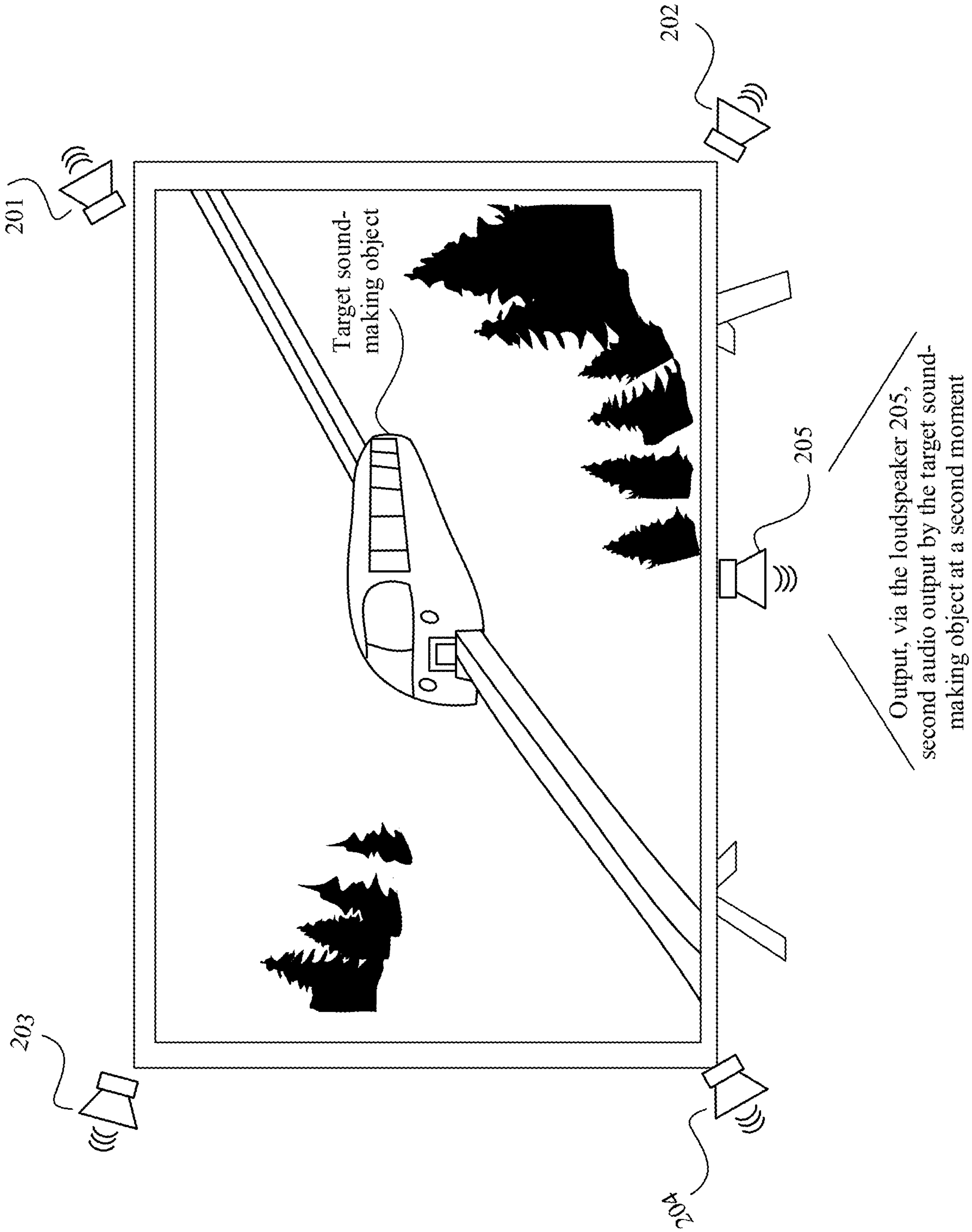
Figure 8C:
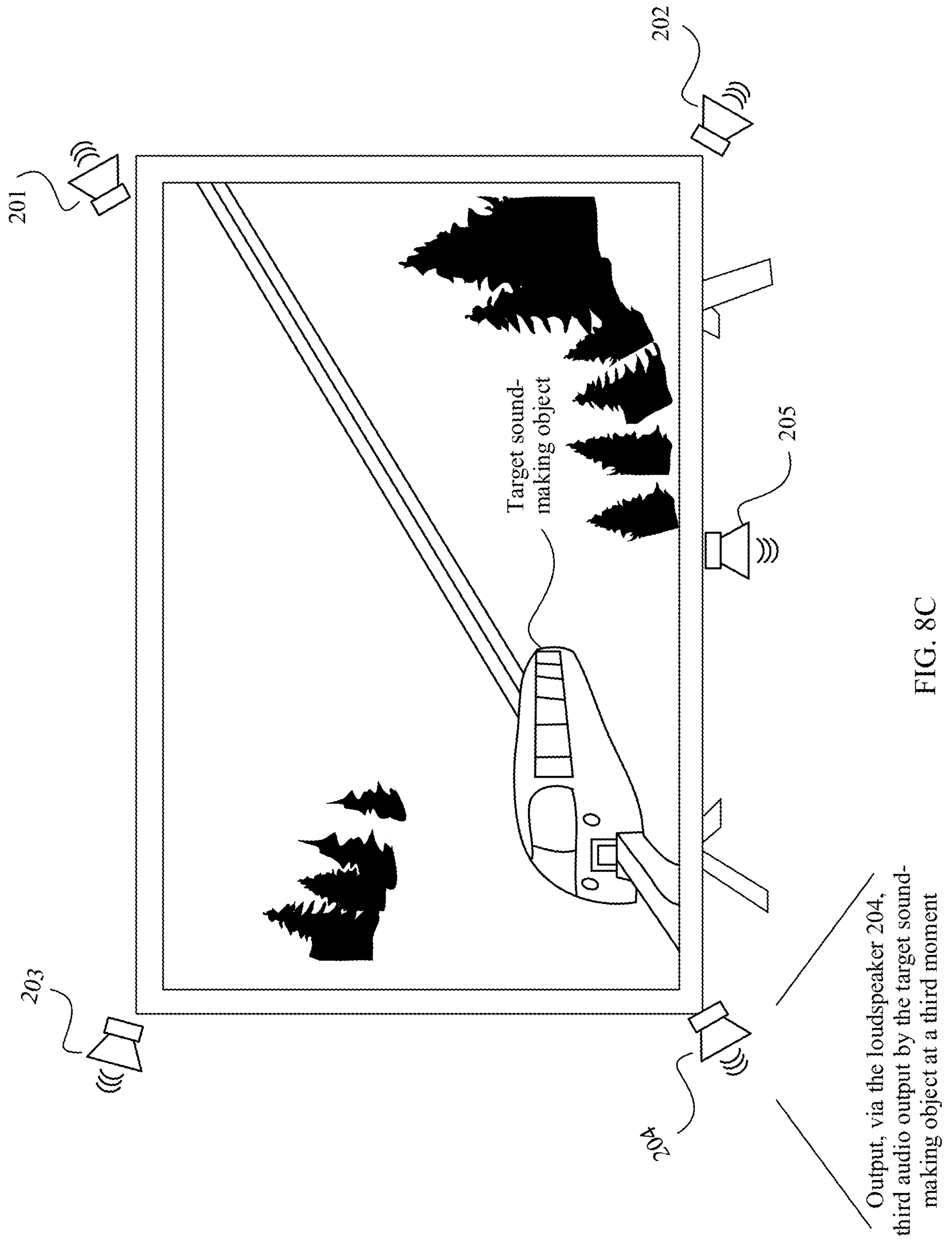

FIG. 8A to FIG. 8C each are a diagram of an example in which the electronic device 100 outputs the audio of the target sound-making object via a different loudspeaker as the location of the target sound-making object (for example, a train) changes.

As shown in FIG. 8A, at a first moment, the electronic device 100 identifies the location of the target sound-making object on the display, and determines that a distance between the target sound-making object and the loudspeaker 201 is shortest, and the electronic device 100 is not externally connected to an audio output device (for example, a sound box). In this case, the electronic device 100 outputs, via the loudspeaker 201, first audio output by the target sound-making object at the first moment.

Optionally, at the first moment, the electronic device 100 may simultaneously output the first audio via the loudspeaker 201, the loudspeaker 202, the loudspeaker 203, the loudspeaker 204, and the loudspeaker 205. However, output volume of the loudspeaker 201, the loudspeaker 202, the loudspeaker 203, the loudspeaker 204, and the loudspeaker 205 is different, and the output volume of the loudspeakers may be gradually decreased based on distances between the target sound-making object and the loudspeakers from near to far. For example, volume of the loudspeaker 201 is greater than output volume of the loudspeaker 202, the loudspeaker 203, the loudspeaker 204, and the loudspeaker 205.

As shown in FIG. 8B, at a second moment, the electronic device 100 identifies the location of the target sound-making object on the display, and determines that a distance between the target sound-making object and the loudspeaker 205 is shortest, and the electronic device 100 is not externally connected to an audio output device (for example, a sound box). In this case, the electronic device 100 outputs, via the loudspeaker 205, second audio output by the target sound-making object at the second moment, where the second moment is later than the first moment.

Optionally, at the second moment, the electronic device 100 may simultaneously output the first audio via the loudspeaker 201, the loudspeaker 202, the loudspeaker 203, the loudspeaker 204, and the loudspeaker 205. However, output volume of the loudspeaker 201, the loudspeaker 202, the loudspeaker 203, the loudspeaker 204, and the loudspeaker 205 is different, and the output volume of the loudspeakers may be gradually decreased based on distances between the target sound-making object and the loudspeakers from near to far. For example, volume of the loudspeaker 205 is greater than output volume of the loudspeaker 202, the loudspeaker 203, the loudspeaker 204, and the loudspeaker 201.

As shown in FIG. 8C, at a third moment, the electronic device 100 identifies the location of the target sound-making object on the display, and determines that a distance between the target sound-making object and the loudspeaker 204 is shortest, and the electronic device 100 is not externally connected to an audio output device (for example, a sound box). In this case, the electronic device 100 outputs, via the loudspeaker 204, third audio output by the target sound-making object at the third moment, where the third moment is later than the second moment.

Optionally, at the third moment, the electronic device 100 may simultaneously output the first audio via the loudspeaker 201, the loudspeaker 202, the loudspeaker 203, the loudspeaker 204, and the loudspeaker 205. However, output volume of the loudspeaker 201, the loudspeaker 202, the loudspeaker 203, the loudspeaker 204, and the loudspeaker 205 is different, and the output volume of the loudspeakers may be gradually decreased based on distances between the target sound-making object and the loudspeakers from near to far. For example, volume of the loudspeaker 204 is greater than output volume of the loudspeaker 202, the loudspeaker 203, the loudspeaker 201, and the loudspeaker 205.

Therefore, it can be seen from FIG. 8A to FIG. 8C that, as the location of the target sound-making object on the display changes, the electronic device 100 can output, via the different loudspeaker, the audio output by the target sound-making object. This implements "audio video integration" and improves video watching experience of a user.

Figure 9A:
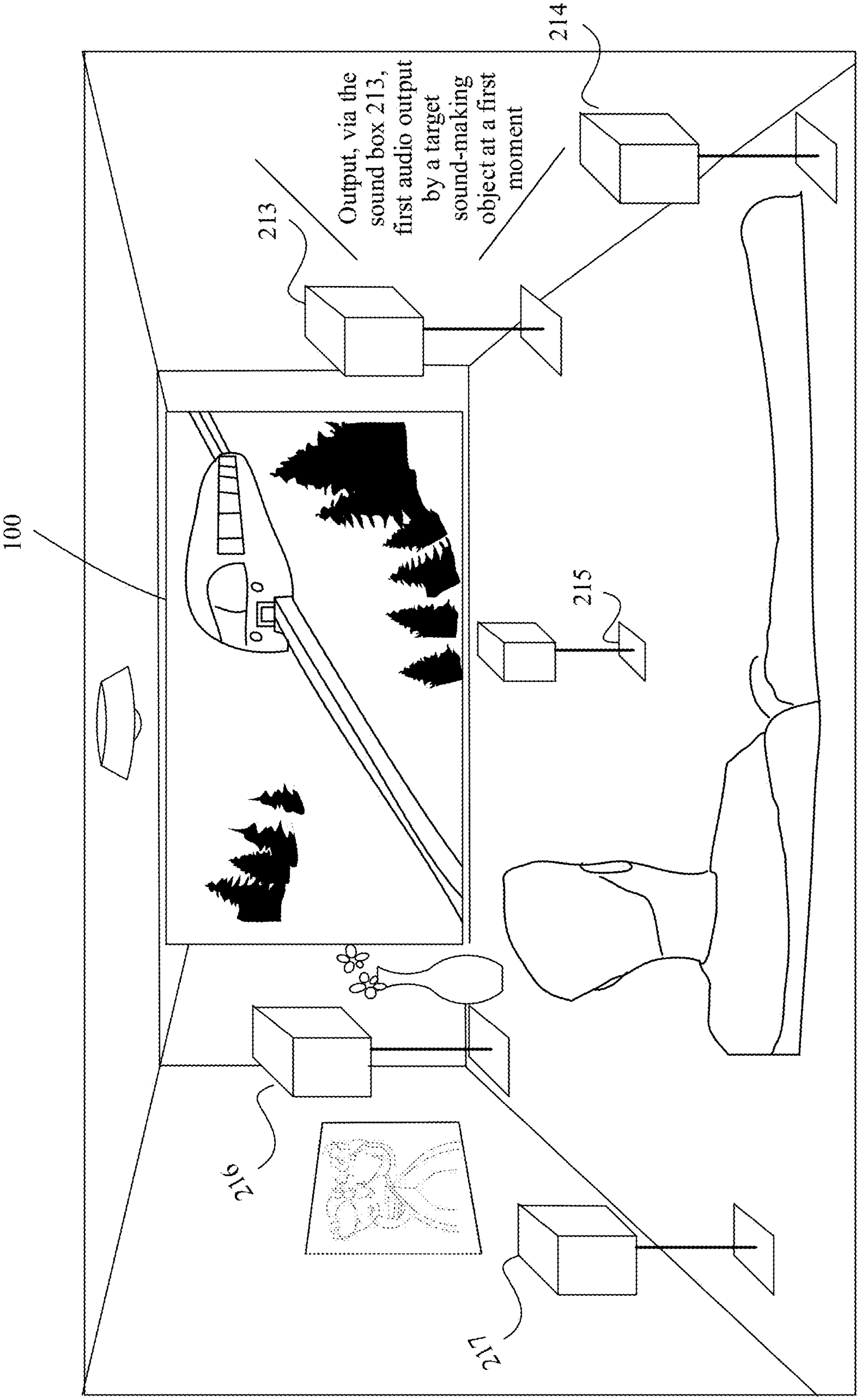
FIG. 9A to FIG. 9C are diagrams of examples in which an electronic device outputs audio of a target sound-making object via a different sound box as a location of the target sound-making object (for example, a train) changes.
Figure 9B:
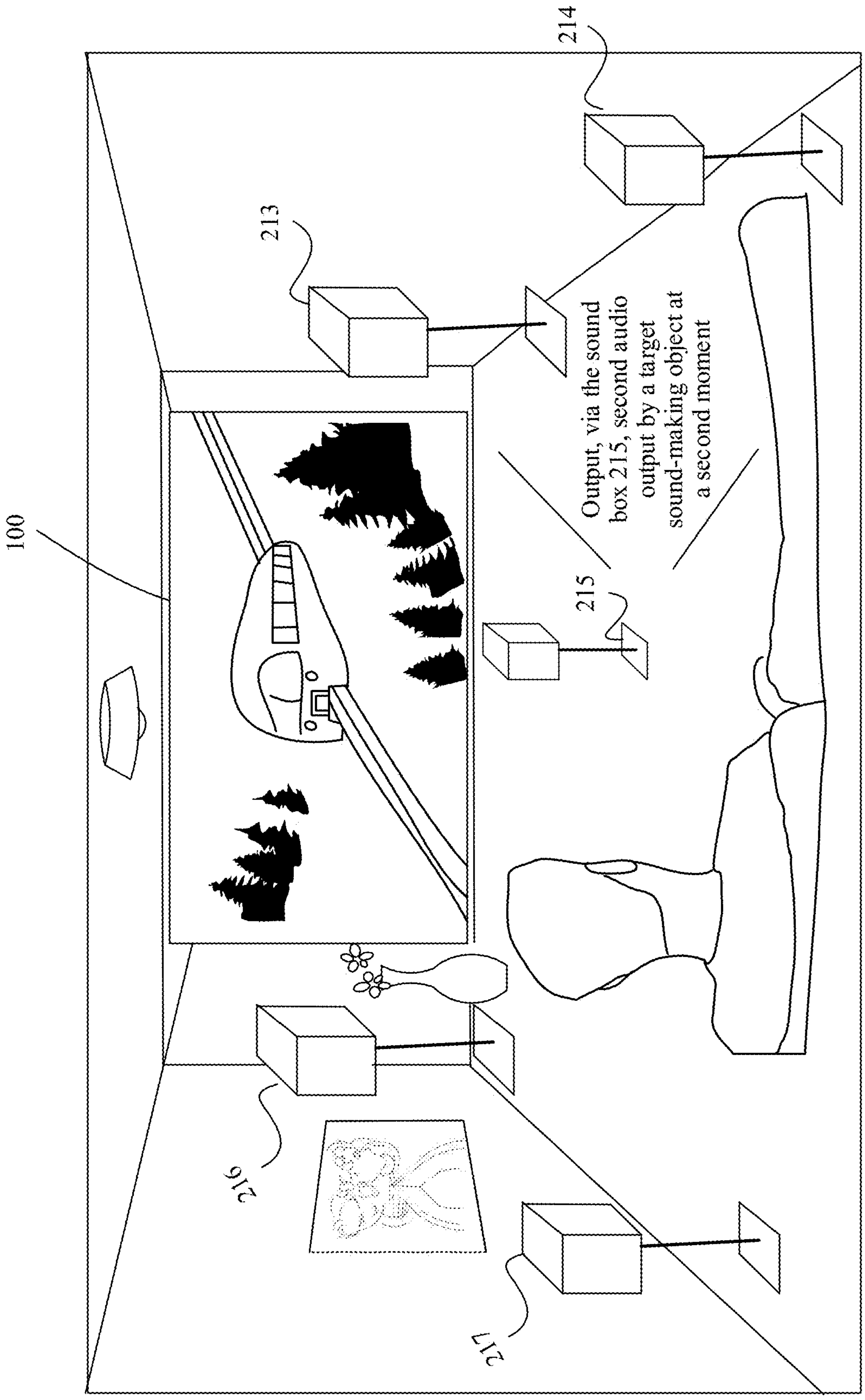
Figure 9C:
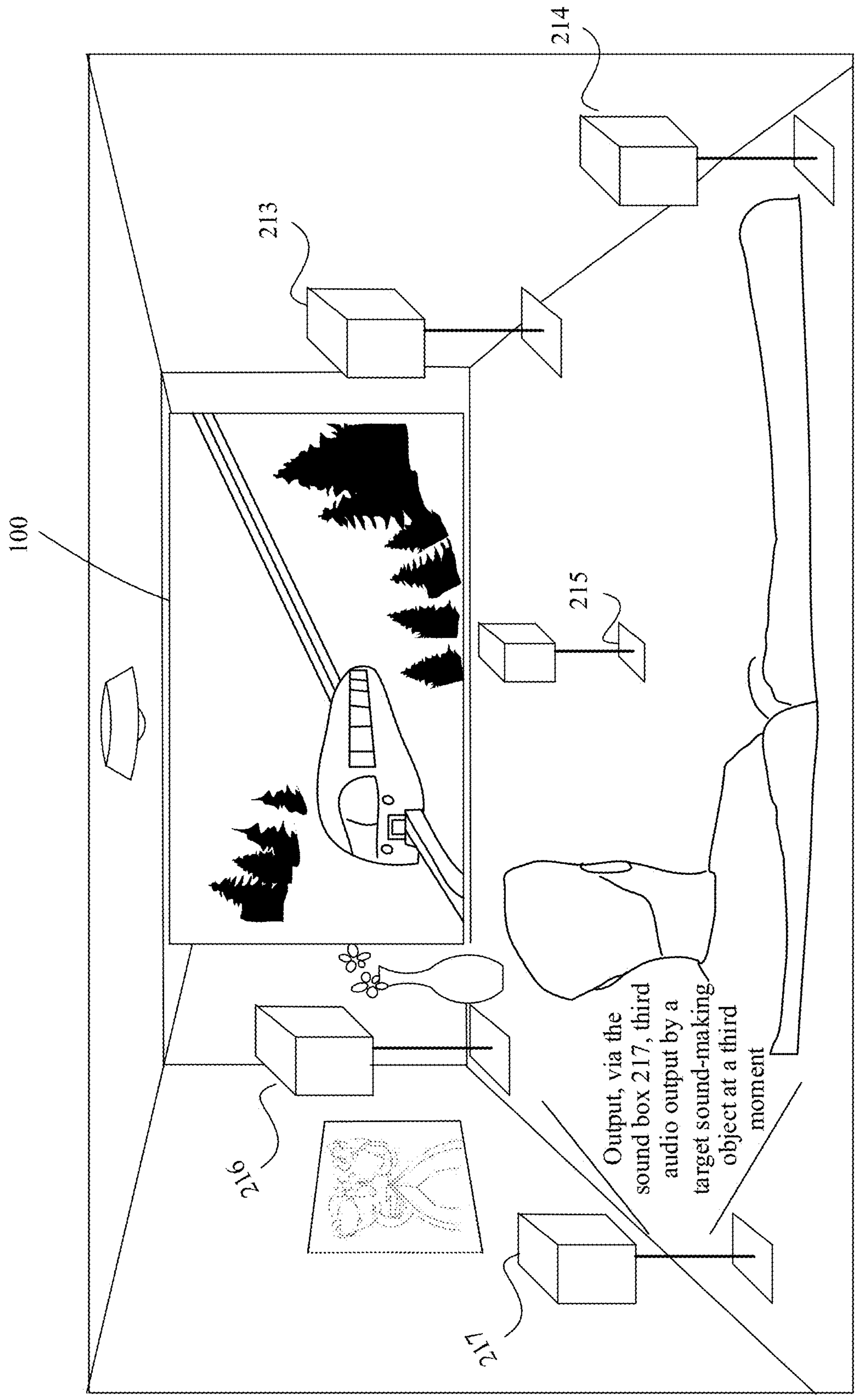

FIG. 9A to FIG. 9C each are a diagram of an example in which the electronic device 100 outputs the audio of the target sound-making object via a different sound box as the location of the target sound-making object (for example, a train) changes.

As shown in FIG. 9A, at a first moment, the electronic device 100 identifies the location of the target sound-making object on the display, and determines that a distance between the target sound-making object and the loudspeaker 201 is shortest, and the loudspeaker 201 corresponds to a first sound channel (for example, a left front sound channel). However, if the electronic device 100 detects that the left front sound channel is connected to the sound box 213, the electronic device 100 outputs, via the sound box 213, first audio output by the target sound-making object at the first moment.

Optionally, at the first moment, the electronic device 100 may simultaneously output the first audio via the sound box 213, the sound box 214, the sound box 215, the sound box 216, and the sound box 217. However, output volume of the sound box 213, the sound box 214, the sound box 215, the sound box 216, and the sound box 217 is different, and the output volume of the sound boxes may be gradually decreased based on distances between the target sound-making object and the sound boxes from near to far. For example, volume of the sound box 213 is greater than output volume of the sound box 214, the sound box 215, the sound box 216, and the sound box 217.

As shown in FIG. 9B, at a second moment, the electronic device 100 identifies the location of the target sound-making object on the display, and determines that a distance between the target sound-making object and the loudspeaker 205 is shortest, and the loudspeaker 205 corresponds to a second sound channel (for example, a center sound channel). However, if the electronic device 100 detects that the center sound channel is connected to the sound box 215, the electronic device 100 outputs, via the sound box 215, second audio output by the target sound-making object at the second moment, where the second moment is later than the first moment.

Optionally, at the second moment, the electronic device 100 may simultaneously output the first audio via the sound box 213, the sound box 214, the sound box 215, the sound box 216, and the sound box 217. However, output volume of the sound box 213, the sound box 214, the sound box 215, the sound box 216, and the sound box 217 is different, and the output volume of the sound boxes may be gradually decreased based on distances between the target sound-making object and the sound boxes from near to far. For example, volume of the sound box 215 is greater than output volume of the sound box 214, the sound box 213, the sound box 216, and the sound box 217.

As shown in FIG. 9C, at a third moment, the electronic device 100 identifies the location of the target sound-making object on the display, and determines that a distance between the target sound-making object and the loudspeaker 204 is shortest, and the loudspeaker 204 corresponds to a third sound channel (for example, a left rear sound channel). However, if the electronic device 100 detects that the left rear sound channel is connected to the sound box 217, the electronic device 100 outputs, via the sound box 217, third audio output by the target sound-making object at the third moment, where the third moment is later than the second moment.

Optionally, at the first moment, the electronic device 100 may simultaneously output the first audio via the sound box 213, the sound box 214, the sound box 215, the sound box 216, and the sound box 217. However, output volume of the sound box 213, the sound box 214, the sound box 215, the sound box 216, and the sound box 217 is different, and the output volume of the sound boxes may be gradually decreased based on distances between the target sound-making object and the sound boxes from near to far. For example, volume of the sound box 217 is greater than output volume of the sound box 214, the sound box 215, the sound box 216, and the sound box 213.

Therefore, it can be seen from FIG. 9A to FIG. 9C that, as the location of the target sound-making object on the display changes, the electronic device 100 can output, via the different sound box, the audio output by the target sound-making object. Outputting the audio via the sound box can improve sound quality of the output audio in one aspect, and can implement "audio video integration" and improve video watching experience of a user in another aspect.

According to the audio output method provided in embodiments of this application, in the video data played by the electronic device 100, after the location of the target sound-making object displayed on the display changes, the audio output location of the target sound-making object also changes. This implements "audio video integration" effect. Embodiments of this application are applicable to a scenario in which a video is output, for example, a digital television (DTV) live broadcast scenario, a Huawei video on demand scenario, and a local video playing scenario.

In the following embodiments of this application, when playing a video, the electronic device 100 receives a user operation, so that "audio video integration" effect is implemented.

Figure 10A:
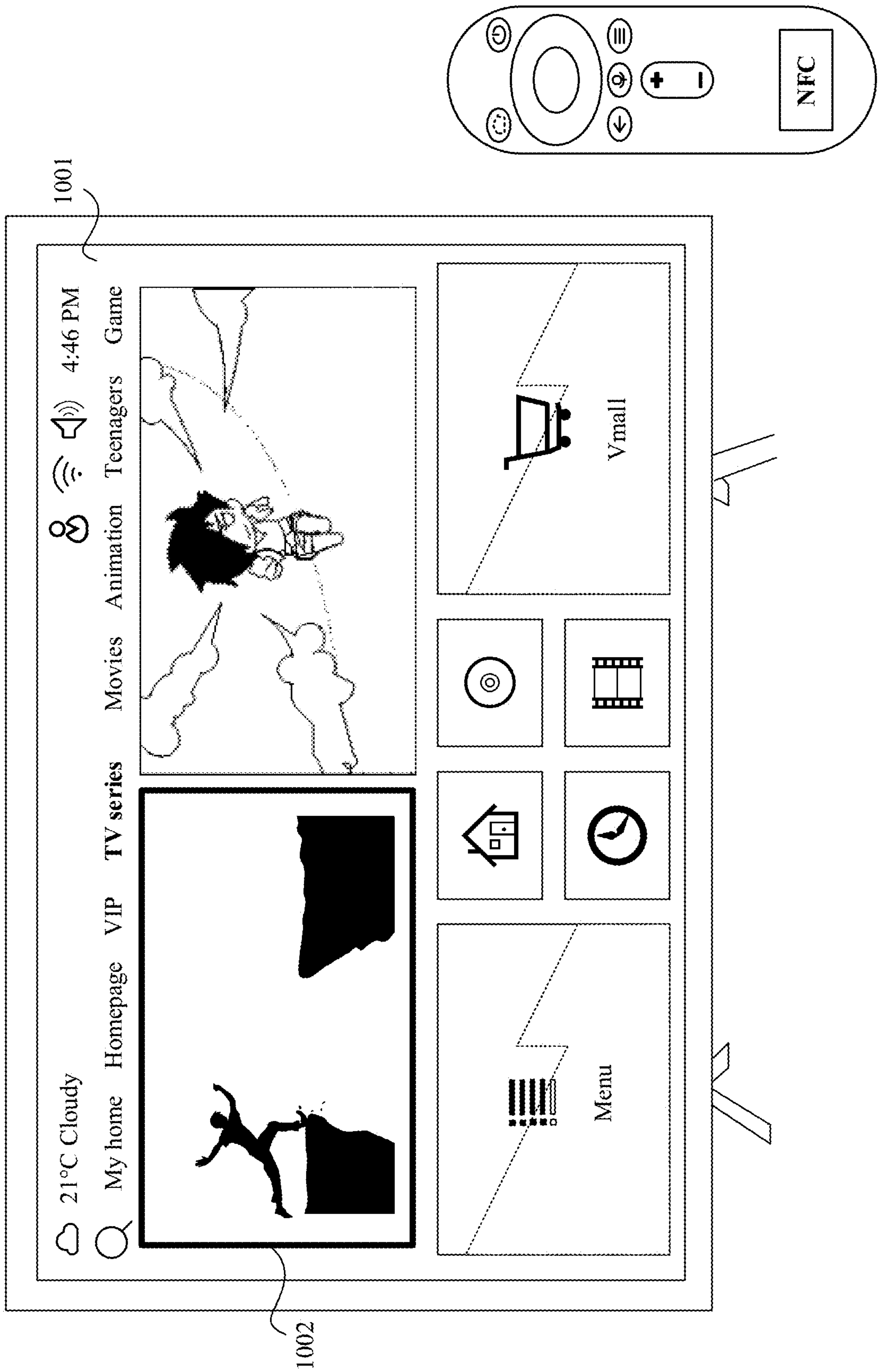
FIG. 10A to FIG. 10C are diagrams of examples in which an electronic device receives a user operation, so that the electronic device implements "audio video integration" effect.
Figure 10B:
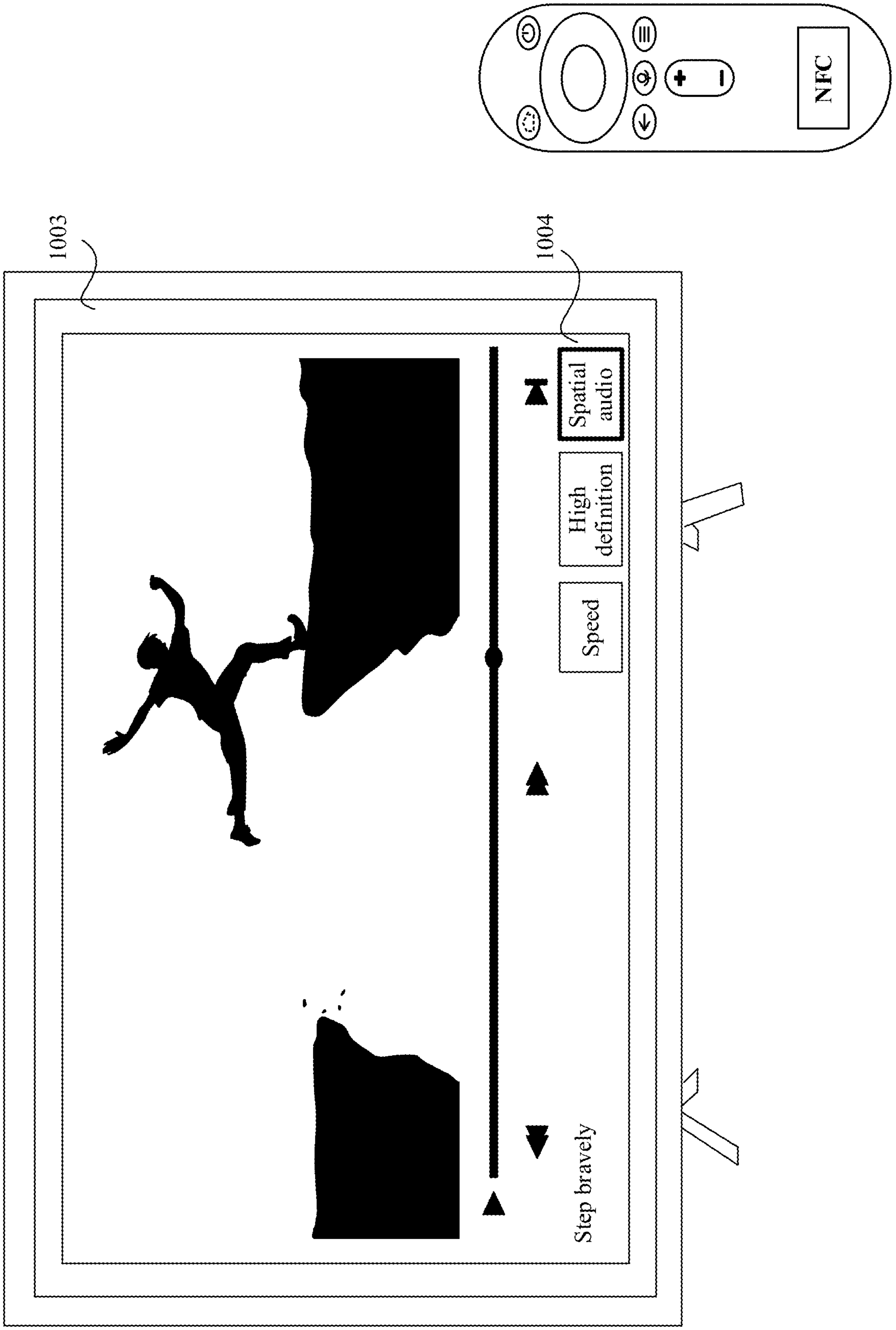
Figure 10C:
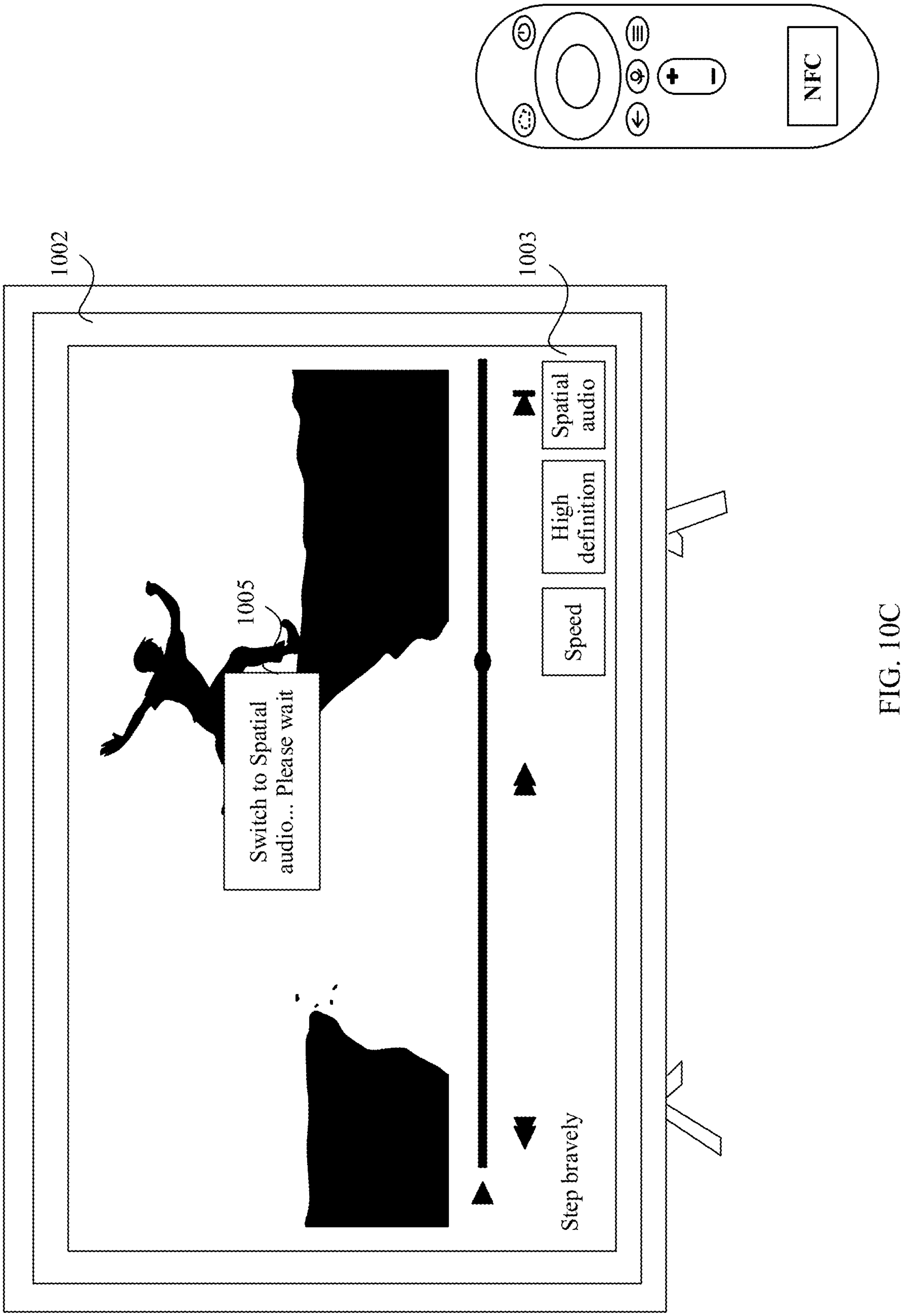

FIG. 10A to FIG. 10C each are a diagram of an example in which the electronic device 100 receives the user operation, so that the electronic device 100 implements the "audio video integration" effect.

As shown in FIG. 10A, the electronic device 100 receives the user operation and displays a user interface 1001. The user interface 1001 shows an example of one or more channel options. For example, there are options such as My home, Homepage, VIP, TV series, Movies, Animation, Teenagers, and Game. The user interface 1001 displays one or more recommended videos under the TV series option, for example, a recommended video 1002.

As shown in FIG. 10A, the electronic device 100 receives the input operation of a user on the recommended video 1002 by using a remote control, and in response to the input operation of the user, the electronic device 100 displays a user interface 1003 shown in FIG. 10B.

The user interface 1003 shows an example of content of the recommended video 1002, including but not limited to video content of the recommended video 1002, a name (for example, Step bravely) of the recommended video 1002, and a plurality of function controls. The plurality of function controls may be a forward control, a backward control, a next episode control, a progress bar, and the like; and the plurality of function controls may also be a speed selection control, a high definition control, a spacial audio control 1004, and the like.

As shown in FIG. 10B, the electronic device 100 may receive the input operation of a user on the spacial audio control 1004 by using a remote control. In response to the input operation of the user, the electronic device 100 may display prompt information 1005 shown in FIG. 10C, where content of the prompt information 1005 includes "switch to Spacial audio . . . Please wait". The prompt information 1005 notifies the user that spacial audio is being switched to.

After the electronic device 100 is switched to spacial audio, the electronic device 100 tracks, on the display based on the method described in the foregoing embodiment, a location of a target sound-making object in "Step bravely". In addition, after the location of the target sound-making object on the display changes, an audio output location of the target sound-making object is changed, so as to implement "audio video integration". In this way, the user can feel that the location of the audio output by the electronic device changes in real time, and the user can feel the spacial audio, thereby improving the user's auditory experience.

Figure 11:
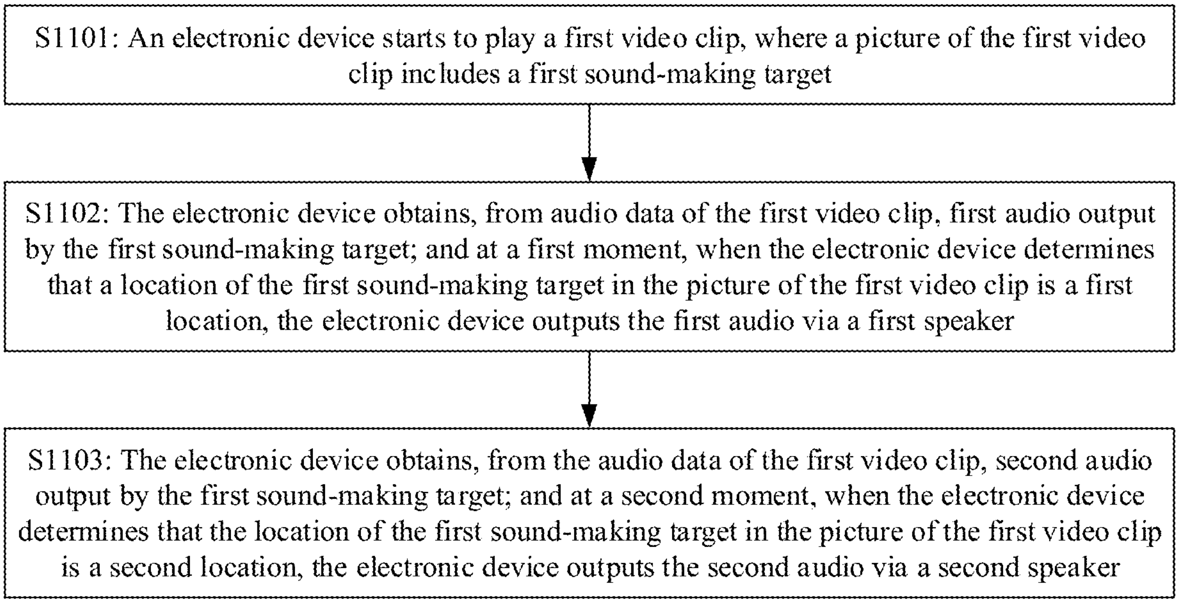
FIG. 11 is a flowchart of an audio playing method according to an embodiment of this application.

FIG. 11 is a flowchart of an audio playing method according to an embodiment of this application.

S1101: An electronic device starts to play a first video clip, where a picture of the first video clip includes a first sound-making target.

S1102: The electronic device obtains, from audio data of the first video clip, first audio output by the first sound-making target; and at a first moment, when the electronic device determines that a location of the first sound-making target in the picture of the first video clip is a first location, the electronic device outputs the first audio via a first speaker.

S1103: The electronic device obtains, from the audio data of the first video clip, second audio output by the first sound-making target; and at a second moment, when the electronic device determines that the location of the first sound-making target in the picture of the first video clip is a second location, the electronic device outputs the second audio via a second speaker.

The first sound-making target may be the target sound-making object shown in FIG. 8A.

The first speaker may be the loudspeaker 201 shown in FIG. 8A, and the second speaker may be the loudspeaker 205 shown in FIG. 8B.

The first audio may be the audio output by the loudspeaker 201 shown in FIG. 8A, and the second audio may be the audio output by the loudspeaker 205 shown in FIG. 8B.

The first location may be the location of the target sound-making object in the image shown in FIG. 8A.

The second location may be the location of the target sound-making object in the image shown in FIG. 8B.

The first moment is different from the second moment, the first location is different from the second location, and the first speaker is different from the second speaker.

This embodiment of this application provides the audio playing method, applied to the electronic device including a plurality of speakers, where the plurality of speakers include the first speaker and the second speaker.

The electronic device obtains the first audio output by the first sound-making target, and the electronic device obtains the second audio output by the first sound-making target. The first audio and the second audio may be extracted and obtained by the electronic device in real time, or the electronic device may obtain in advance complete audio output by the first sound-making target, where the first audio and the second audio are audio clips in the complete audio output by the first sound-making target at different moments.

According to the audio playing method provided in this embodiment of this application, the electronic device can change a sound-making location of a target sound-making object based on a relative distance between the target sound-making object in an image frame and each loudspeaker on the electronic device, so that the sound-making location of the target sound-making object in a video changes with a display location of the target sound-making object on the display. This implements "audio video integration" and improves video watching experience of a user.

In an implementation, that when the electronic device determines that a location of the first sound-making target in the picture of the first video clip is a first location, the electronic device outputting the first audio via the first speaker includes: when the electronic device determines that a distance between the first location of the first sound-making target in the picture of the first video clip and the first speaker is shorter than a distance between the first location of the first sound-making target in the picture of the first video clip and the second speaker, the electronic device outputs the first audio via the first speaker; and that when the electronic device determines that the location of the first sound-making target in the picture of the first video clip is a second location, the electronic device outputting the second audio via the second speaker includes: when the electronic device determines that the distance between the first location of the first sound-making target in the picture of the first video clip and the second speaker is shorter than the distance between the first location of the first sound-making target in the picture of the first video clip and the first speaker, the electronic device outputs the second audio via the second speaker. In this way, after determining that the location of the first sound-making target in the picture of the first video clip is the first location, the electronic device further determines a speaker closest to the first location, and outputs, via the closest speaker, audio that is output by the first sound-making target at a corresponding moment, so that the sound-making location of the target sound-making object changes with the display location of the target sound-making object on the display.

For details, refer to related descriptions in FIG. 8A to FIG. 8C. Details are not described in this embodiment of this application again.

In an implementation, that when the electronic device determines that a location of the first sound-making target in the picture of the first video clip is a first location, the electronic device outputting the first audio via the first speaker includes: when the electronic device determines that a distance between the first location of the first sound-making target in the picture of the first video clip and the first speaker is shorter than a distance between the first location of the first sound-making target in the picture of the first video clip and the second speaker, the electronic device outputs the first audio via the first speaker at a first volume value and outputs the first audio via the second speaker at a second volume value, where the first volume value is greater than the second volume value; and that when the electronic device determines that the location of the first sound-making target in the picture of the first video clip is a second location, the electronic device outputting the second audio via the second speaker includes: when the electronic device determines that the distance between the first location of the first sound-making target in the picture of the first video clip and the second speaker is shorter than the distance between the first location of the first sound-making target in the picture of the first video clip and the first speaker, the electronic device outputs the first audio via the second speaker at a third volume value and outputs the first audio via the first speaker at a fourth volume value, where the third volume value is greater than the fourth volume value. In this way, after determining that the location of the first sound-making target in the picture of the first video clip is the first location, the electronic device further determines a distance between each speaker and the first location. With different distances, output volume of each speaker is different, that is, each speaker may simultaneously make a sound. The shorter a distance, the higher output volume of a speaker. The longer a distance, the lower output volume of a speaker.

For details, refer to related descriptions in FIG. 8A to FIG. 8C. Details are not described in this embodiment of this application again.

In an implementation, the picture of the first video clip includes a second sound-making target, and the method further includes: the electronic device extracts, from the audio data of the first video clip, third audio output by the second sound-making target; at a third moment, when the electronic device determines that a location of the second sound-making target in the picture of the first video clip is a third location, the electronic device outputs the third audio via the first speaker; the electronic device extracts, from the audio data of the first video clip, fourth audio output by the second sound-making target; and at a fourth moment, when the electronic device determines that the location of the second sound-making target in the picture of the first video clip is a fourth location, the electronic device outputs the fourth audio via the second speaker, where the third moment is different from the fourth moment, and the third location is different from the fourth location. In this way, the electronic device can simultaneously detect locations of a plurality of sound-making targets and speakers, and change sound-making locations of the plurality of sound-making targets.

In an implementation, the plurality of speakers further include a third speaker; and after the electronic device outputs the first audio via the first speaker, the method further includes: in a case in which the electronic device does not detect the location of the first sound-making target in the picture of the first video clip after first time has passed or a quantity of image frames has exceeded a first quantity, the electronic device outputs audio of the first sound-making target via the third speaker. In this way, when the electronic device detects only the audio of the first sound-making target, but does not detect an image location of the first sound-making target in the image data, the electronic device outputs the audio of the first sound-making target via a preset speaker.

In an implementation, that when the electronic device determines that a distance between the first location of the first sound-making target in the picture of the first video clip and the first speaker is shorter than a distance between the first location of the first sound-making target in the picture of the first video clip and the second speaker, the electronic device outputting the first audio via the first speaker include: the electronic device obtains location information of the first speaker and location information of the second speaker; and the electronic device determines, based on the first location of the first sound-making target in the picture of the first video clip, the location information of the first speaker, and the location information of the second speaker, that the distance between the first location of the first sound-making target in the picture of the first video clip and the first speaker is shorter than the distance between the first location of the first sound-making target in the picture of the first video clip and the second speaker. In this way, a location of each speaker on the electronic device is specific, and the electronic device can determine a distance between the first sound-making target and each speaker based on the location of each speaker and a location of the first sound-making target in the picture.

For how to determine the distance between the first sound-making target and each speaker, refer to related descriptions in FIG. 6 and FIG. 7. Details are not described in this embodiment of this application again.

In an implementation, that the electronic device obtains, from audio data of the first video clip, first audio output by the first sound-making target includes: the electronic device obtains a plurality of types of audio from the audio data of the first video clip based on a plurality of types of preset audio features; and the electronic device determines, from the plurality of types of audio, the first audio output by the first sound-making target. In this way, the electronic device can calculate, based on the plurality of types of preset audio features, similarity between the plurality of types of audio in the audio data and the plurality of types of preset audio features, to determine the first audio output by the first sound-making target.

For details, refer to related descriptions in Table 1. Details are not described in this embodiment of this application again.

In an implementation, that the electronic device determines that a location of the first sound-making target in the picture of the first video clip is a first location includes: the electronic device identifies, from the picture of the first video clip based on the plurality of types of preset image features, a first target image corresponding to the first sound-making target; and the electronic device determines, based on a display area of the first target image in the picture of the first video clip, that the location of the first sound-making target in the picture of the first video clip is the first location. In this way, the electronic device can determine, based on the plurality of types of preset image features, an image feature of the first target image corresponding to the first sound-making target, to determine a location of the first target image in the picture of the first video clip.

For details, refer to related descriptions in Table 2. Details are not described in this embodiment of this application again.

In an implementation, the plurality of speakers further include a fourth speaker; and before the electronic device outputs the first audio, the method further includes: the electronic device obtains preset sound channel information from the audio data of the first video clip, where the preset sound channel information includes outputting the first audio and a first background sound from the fourth speaker; and that when the electronic device determines that a location of the first sound-making target in the picture of the first video clip is a first location, the electronic device outputs the first audio via the first speaker includes: when the electronic device determines that the location of the first sound-making target in the picture of the first video clip is the first location, the electronic device outputs the first audio via the first speaker, and outputs the first background sound via the fourth speaker. In this way, when determining that the location of the first sound-making target in the picture of the first video clip is the first location, the electronic device can render the first audio to the first speaker, output the first audio via the first speaker, and output other audio such as a background sound and a music sound via a preset speaker.

For how the electronic device renders the first audio to the first speaker, refer to related descriptions in Table 4, Table 5, and Table 6. Details are not described in this embodiment of this application again.

In an implementation, location information of the plurality of speakers on the electronic device is different. In this way, the sound-making location of the target sound-making object changes with the display location of the target sound-making object on the display.

In an implementation, a type of the first sound-making target is any one of the following: a person, an animal, an object, and a landscape.

In an implementation, a type of the first audio is any one of the following: a human sound, an animal sound, an ambient sound, a music sound, and an object sound.

Figure 12:
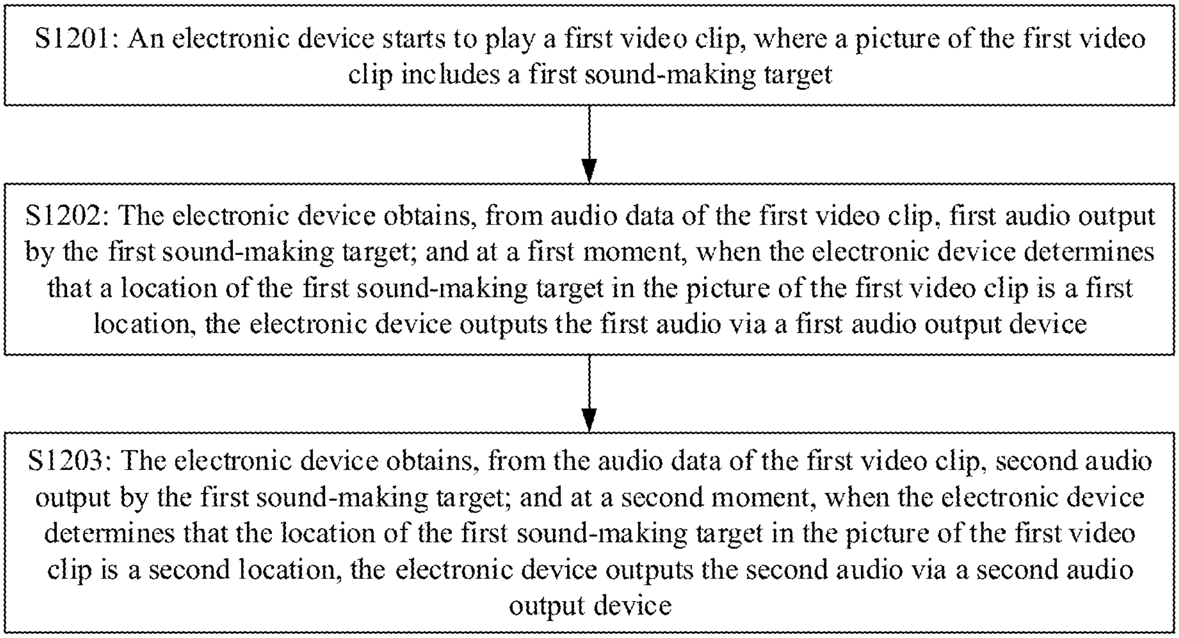
FIG. 12 is a flowchart of another audio playing method according to an embodiment of this application.

FIG. 12 is a flowchart of another audio playing method according to an embodiment of this application.

S1201: An electronic device starts to play a first video clip, where a picture of the first video clip includes a first sound-making target.

S1202: The electronic device obtains, from audio data of the first video clip, first audio output by the first sound-making target; and at a first moment, when the electronic device determines that a location of the first sound-making target in the picture of the first video clip is a first location, the electronic device outputs the first audio via a first audio output device.

S1203: The electronic device obtains, from the audio data of the first video clip, second audio output by the first sound-making target; and at a second moment, when the electronic device determines that the location of the first sound-making target in the picture of the first video clip is a second location, the electronic device outputs the second audio via a second audio output device.

The first sound-making target may be the target sound-making object shown in FIG. 9A.

The first audio output device may be the sound box 213 shown in FIG. 9A, and the second audio output device may be the sound box 215 shown in FIG. 9B.

The first audio may be the audio output by the sound box 213 shown in FIG. 9A, and the second audio may be the audio output by the sound box 215 shown in FIG. 9B.

The first location may be the location of the target sound-making object in the image shown in FIG. 9A.

The second location may be the location of the target sound-making object in the image shown in FIG. 9B.

The first moment is different from the second moment, the first location is different from the second location, and the first audio output device is different from the second audio output device.

The electronic device obtains the first audio output by the first sound-making target, and the electronic device obtains the second audio output by the first sound-making target. The first audio and the second audio may be extracted and obtained by the electronic device in real time, or the electronic device may obtain in advance complete audio output by the first sound-making target, where the first audio and the second audio are audio clips in the complete audio output by the first sound-making target at different moments.

According to the method provided in the second aspect, when the electronic device is externally connected to an audio output device, the electronic device can change a sound-making location of the target sound-making object based on a relative distance between the target sound-making object in an image frame and the audio output device, so that the sound-making location of the target sound-making object in a video changes with a display location of the target sound-making object on the display. This implements "audio video integration" and improves video watching experience of a user.

If speakers are installed on the electronic device 100, the electronic device 100 may obtain location information of each speaker on the electronic device 100, and determine a distance between the first sound-making target and each speaker based on the location information of each speaker on the electronic device 100 and a location of the first sound-making target in the picture of the first video clip. Then, the electronic device 100 obtains sound channel information corresponding to each speaker. If an audio output device (for example, a sound box) is connected to a sound channel, the electronic device 100 outputs, via the audio output device, audio that is output by the sound channel; or if no audio output device (for example, a sound box) is connected to the sound channel, the electronic device 100 outputs, via a corresponding speaker, audio that is output by the sound channel.

If there is no speaker (for example, a projector) on the electronic device 100, the electronic device 100 cannot obtain location information of each speaker on the electronic device 100, but the electronic device 100 is connected to an audio output device, the electronic device 100 may determine location information of the connected audio output device, for example, a location in space. Then, the electronic device 100 determines a distance between the first sound-making target and each audio output device based on the location information of the audio output device and a location of the first sound-making target in the picture of the first video clip. Then, audio of the first sound-making target is output via a corresponding audio output device based on the distance between the first sound-making target and each audio output device.

In an implementation, a type of the first audio output device is any one of the following: a sound box, an earphone, a power amplifier, a multimedia console, and an audio adapter.

It should be noted that the plurality of implementations provided in the method procedure shown in FIG. 11 may also be applied to the method procedure shown in FIG. 12. Details are not described in embodiments of this application again.

The implementations of this application may be randomly combined to achieve different technical effect.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, including one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the procedures of the methods in embodiments may be implemented by a computer program instructing relevant hardware. The program may be stored in a computer-readable storage medium. When the program is run, the procedures of the methods in embodiments are performed. The foregoing storage medium includes any medium that can store program code, such as a ROM, a random access memory RAM, a magnetic disk, or an optical disc.

In conclusion, the foregoing descriptions are merely embodiments of the technical solutions of the present disclosure, but are not intended to limit the protection scope of the present disclosure. Any modification, equivalent replacement, or improvement made according to the disclosure shall fall within the protection scope of the present disclosure.

The invention claimed is:

1. An audio playing method for an electronic device including a plurality of speakers, the plurality of speakers including a first speaker and a second speaker, the method comprising:

starting, by the electronic device, play of a first video clip, a picture of the first video clip comprising a first sound-making target;

obtaining, by the electronic device from audio data of the first video clip, first audio outputted by the first sound-making target;

outputting, by the electronic device, the first audio via the first speaker at a first moment when the electronic device determines that a location of the first sound-making target in the picture of the first video clip is a first location;

obtaining, by the electronic device from the audio data of the first video clip, second audio outputted by the first sound-making target; and outputting, by the electronic device, the second audio via the second speaker at a second moment, when the electronic device determines that the location of the first sound-making target in the picture of the first video clip is a second location;

wherein the first moment is different from the second moment, the first location is different from the second location, and the first speaker is different from the second speaker.

2. The method according to claim 1, wherein:

outputting, by the electronic device, the first audio via the first speaker when the electronic device determines the location of the first sound-making target in the picture of the first video clip is the first location comprises:

outputting, by the electronic device, the first audio via the first speaker when the electronic device determines that a distance between the first location of the first sound-making target in the picture of the first video clip and the first speaker is shorter than a distance between the first location of the first sound-making target in the picture of the first video clip and the second speaker; and outputting, by the electronic device, the second audio via the second speaker when the electronic device determines the location of the first sound-making target in the picture of the first video clip is a second location, comprises:

outputting, by the electronic device, the second audio via the second speaker when the electronic device determines that the distance between the first location of the first sound-making target in the picture of the first video clip and the second speaker is shorter than the distance between the first location of the first sound-making target in the picture of the first video clip and the first speaker.

3. The method according to claim 1, wherein:

outputting, by the electronic device, the first audio via the first speaker when the electronic device determines that the location of the first sound-making target in the picture of the first video clip is the first location, comprises:

outputting, by the electronic device, the second audio via the first speaker at a first volume value and outputting the second audio via the second speaker at a second volume value when the electronic device determines that a distance between the first location of the first sound-making target in the picture of the first video clip and the first speaker is shorter than a distance between the first location of the first sound-making target in the picture of the first video clip and the second speaker, wherein the first volume value is greater than the second volume value; and outputting, by the electronic device, the second audio via the second speaker when the electronic device determines the location of the first sound-making target in the picture of the first video clip is a second location, comprises:

outputting, by the electronic device, the first audio via the second speaker at a third volume value and outputting the first audio via the first speaker at a fourth volume value when the electronic device determines that the distance between the first location of the first sound-making target in the picture of the first video clip and the second speaker is shorter than the distance between the first location of the first sound-making target in the picture of the first video clip and the first speaker, wherein the third volume value is greater than the fourth volume value.

4. The method according to claim 1, wherein the picture of the first video clip comprises a second sound-making target, the method further comprising:

extracting, by the electronic device from the audio data of the first video clip, third audio outputted by the second sound-making target;

outputting, by the electronic device, the third audio via the first speaker at a third moment when the electronic device determines that a location of the second sound-making target in the picture of the first video clip is a third location;

extracting, by the electronic device from the audio data of the first video clip, fourth audio outputted by the second sound-making target; and outputting, by the electronic device, the fourth audio via the second speaker at a fourth moment when the electronic device determines that the location of the second sound-making target in the picture of the first video clip is a fourth location;

wherein the third moment is different from the fourth moment and the third location is different from the fourth location.

5. The method according to claim 1, wherein the plurality of speakers further comprise a third speaker, and after the outputting, by the electronic device, the first audio via the first speaker, the method further comprises:

outputting, by the electronic device, audio of the first sound-making target via the third speaker when the electronic device does not detect the location of the first sound-making target in the picture of the first video clip after first time has passed or a quantity of image frames has exceeded a first quantity.

6. The method according to claim 5, wherein the third speaker is different from the first speaker and the second speaker.

7. The method according to claim 2, wherein:

outputting, by the electronic device, the first audio via the first speaker when the electronic device determines that the distance between the first location of the first sound-making target in the picture of the first video clip and the first speaker is shorter than the distance between the first location of the first sound-making target in the picture of the first video clip and the second speaker, comprises:

obtaining, by the electronic device, location information of the first speaker and location information of the second speaker; and determining, by the electronic device based on the first location of the first sound-making target in the picture of the first video clip, the location information of the first speaker and the location information of the second speaker, wherein the distance between the first location of the first sound-making target in the picture of the first video clip and the first speaker is shorter than the distance between the first location of the first sound-making target in the picture of the first video clip and the second speaker.

8. The method according to claim 1, wherein the obtaining, by the electronic device from the audio data of the first video clip, the first audio outputted by the first sound-making target further comprises:

obtaining, by the electronic device, a plurality of types of audio from the audio data of the first video clip based on a plurality of types of preset audio features; and determining, by the electronic device from the plurality of types of audio, the first audio outputted by the first sound-making target.

9. The method according to claim 1, wherein the determining, by the electronic device, that the location of the first sound-making target in the picture of the first video clip is the first location further comprises:

identifying, by the electronic device from the picture of the first video clip based on the plurality of types of preset image features, a first target image corresponding to the first sound-making target; and determining, by the electronic device based on a display area of the first target image in the picture of the first video clip, that the location of the first sound-making target in the picture of the first video clip is the first location.

10. The method according to claim 1, wherein the plurality of speakers comprise a fourth speaker; and before the outputting, by the electronic device, the first audio, the method further comprises:

obtaining, by the electronic device, preset sound channel information from the audio data of the first video clip, the preset sound channel information comprising outputting the first audio and a first background sound from the fourth speaker; and outputting, by the electronic device, the first audio via the first speaker when the electronic device determines that the location of the first sound-making target in the picture of the first video clip is the first location comprises:

outputting, by the electronic device, the first audio via the first speaker and outputting the first background sound via the fourth speaker when the electronic device determines that the location of the first sound-making target in the picture of the first video clip is the first location.

11. The method according to claim 1, wherein location information of the plurality of speakers on the electronic device is different.

12. The method according to claim 1, wherein a type of the first sound-making target is any one of: a person, an animal, an object, or a landscape.

13. The method according to claim 1, wherein a type of the first audio is any one of: a human sound, an animal sound, an ambient sound, a music sound, or an object sound.

14. An audio playing method, the method comprising:

starting, by an electronic device, play of a first video clip, wherein a picture of the first video clip comprises a first sound-making target;

obtaining, by the electronic device from audio data of the first video clip, first audio outputted by the first sound-making target;

outputting, by the electronic device, the first audio via a first audio output device at a first moment, when the electronic device determines that a location of the first sound-making target in the picture of the first video clip is a first location;

obtaining, by the electronic device from the audio data of the first video clip, second audio outputted by the first sound-making target; and outputting, by the electronic device, the second audio via a second audio output device at a second moment, when the electronic device determines that the location of the first sound-making target in the picture of the first video clip is a second location;

wherein the first moment is different from the second moment, the first location is different from the second location, and the first audio output device is different from the second audio output device.

15. The method according to claim 14, wherein a type of the first audio output device is any one of: a sound box, an earphone, a power amplifier, a multimedia console, or an audio adapter.

16. An electronic device, comprising:

a memory storing instructions; and at least one processor in communication with the memory, the at least one processor configured, upon execution of the instructions, to perform the following steps:

starting play of a first video clip, a picture of the first video clip comprising a first sound-making target;

obtaining, from audio data of the first video clip, first audio outputted by the first sound-making target;

outputting the first audio via the first speaker at a first moment, when the at least one processor determines that a location of the first sound-making target in the picture of the first video clip is a first location;

obtaining, from the audio data of the first video clip, second audio outputted by the first sound-making target; and outputting the second audio via the second speaker at a second moment, when the at least one processor determines that the location of the first sound-making target in the picture of the first video clip is a second location;

wherein the first moment is different from the second moment, the first location is different from the second location, and the first speaker is different from the second speaker.

17. The electronic device according to claim 16, wherein:

outputting the first audio via the first speaker when the electronic device determines that the location of the first sound-making target in the picture of the first video clip is the first location, comprises:

outputting the first audio via the first speaker when a distance between the first location of the first sound-making target in the picture of the first video clip and the first speaker is shorter than a distance between the first location of the first sound-making target in the picture of the first video clip and the second speaker; and outputting the second audio via the second speaker when the location of the first sound-making target in the picture of the first video clip is a second location, comprises:

outputting the second audio via the second speaker when the distance between the first location of the first sound-making target in the picture of the first video clip and the second speaker is shorter than the distance between the first location of the first sound-making target in the picture of the first video clip and the first speaker.

18. The electronic device according to claim 16, wherein:

outputting the first audio via the first speaker when a location of the first sound-making target in the picture of the first video clip is a first location, comprises:

outputting the second audio via the first speaker at a first volume value and outputting the second audio via the second speaker at a second volume value when a distance between the first location of the first sound-making target in the picture of the first video clip and the first speaker is shorter than a distance between the first location of the first sound-making target in the picture of the first video clip and the second speaker, wherein the first volume value is greater than the second volume value; and outputting the second audio via the second speaker when the location of the first sound-making target in the picture of the first video clip is a second location, comprises:

outputting the first audio via the second speaker at a third volume value and outputting the first audio via the first speaker at a fourth volume value when the distance between the first location of the first sound-making target in the picture of the first video clip and the second speaker is shorter than the distance between the first location of the first sound-making target in the picture of the first video clip and the first speaker, wherein the third volume value is greater than the fourth volume value.

19. The electronic device according to claim 16, wherein the picture of the first video clip comprises a second sound-making target, and the one or more processors further execute the instructions to perform the steps of:

extracting, from the audio data of the first video clip, third audio outputted by the second sound-making target;

outputting the third audio via the first speaker at a third moment, when the at least one processor determines that a location of the second sound-making target in the picture of the first video clip is a third location;

extracting, from the audio data of the first video clip, fourth audio outputted by the second sound-making target; and outputting the fourth audio via the second speaker at a fourth moment, when the at least one processor determines that the location of the second sound-making target in the picture of the first video clip is a fourth location;

wherein the third moment is different from the fourth moment, and the third location is different from the fourth location.

20. The electronic device according to claim 16, wherein the plurality of speakers further comprise a third speaker, and after the outputting the first audio via the first speaker, the at least one processor further executes the instructions to perform the step of:

outputting audio of the first sound-making target via the third speaker when the at least one processor does not detect the location of the first sound-making target in the picture of the first video clip after first time has passed or a quantity of image frames has exceeded a first quantity.

* * * * *